United States Patent [19]

Sasayama et al.

[11] Patent Number: 5,493,434
[45] Date of Patent: Feb. 20, 1996

[54] PHOTONIC FREQUENCY DIVISION MULTIPLEXED FIFO BUFFER

[75] Inventors: Koji Sasayama, Saitamaken; Keishi Habara, Tokyo, both of Japan

[73] Assignee: Nippon Telegraph and Telephone Corporation, Tokyo, Japan

[21] Appl. No.: 449,683

[22] Filed: May 24, 1995

Related U.S. Application Data

[62] Division of Ser. No. 275,121, Jul. 14, 1994.

[30] Foreign Application Priority Data

Jul. 14, 1993 [JP] Japan ................................. 5-174507
May 24, 1994 [JP] Japan ................................. 6-109508

[51] Int. Cl.[6] .................................................. H04J 14/08
[52] U.S. Cl. ...................... 359/123; 359/139; 359/140; 359/135
[58] Field of Search ...................................... 359/123, 135, 359/138, 139, 140; 385/24; 365/215, 234; 370/49.5, 50

[56] References Cited

U.S. PATENT DOCUMENTS 5,103,333  4/1992  Koai ........................................ 359/140
5,115,428  5/1992  Ramanan et al. ....................... 359/140
5,287,316  2/1994  Urushidani et al. .................... 365/215

Primary Examiner—Leo H. Boudreau
Assistant Examiner—Bhavesh Mehta
Attorney, Agent, or Firm—Banner & Allegretti, Ltd.

[57] ABSTRACT

A photonic frequency division multiplexed FIFO buffer capable of realizing a multiple input one output FIFO buffer or a one input one output FIFO buffer by using only a small number of buffers. This buffer is formed by a plurality of loop shaped optical waveguide delay lines for storing the input optical signals from the time division multiplexed input highway, which are connected in series by a plurality of 2×2 optical switches for selectively transferring the input optical signals among the loop shaped optical waveguide delay lines. This buffer also includes a 1×2 frequency channel selector, connected at a last stage of the loop shaped optical waveguide delay lines, for selectively outputting optical signals in specific frequency channels among the input optical signals stored by the last stage of the loop shaped optical waveguide delay lines as the output optical signals to the timeslots on the time division multiplexed output highway.

7 Claims, 22 Drawing Sheets

PHOTONIC FREQUENCY DIVISION MULTIPLEXED FIFO BUFFER

This application is a division of application Ser. No. 08/275,121, filed Jul. 14, 1994 and entitled, "Photonic Frequency Division Multiplexed Fifo Buffer".

BACKGROUND OF THE INVENTION

1. Field of the Invention

The present invention relates to a FIFO buffer used as a buffer for buffering signals waiting for processing in the signal processing or as a buffer for absorbing collision in an interconnection network of an exchanger, and more particularly, to a photonic frequency division multiplexed FIFO buffer used in an optical computer or an optical exchanger for processing high speed optical signals.

2. Description of the Background Art

As a photonic buffer using a wide bandwidth optical delay line, and especially as a photonic FIFO buffer for connecting signals from a plurality of input highways to a single output highway, there has been a configuration as shown in FIG. 1, in which a one input one output FIFO buffer is provided for each input highway. More specifically, this configuration of FIG. 1 comprises: an input highways 1-1-1 to 1-1-M, signal discarding lines 1-2-1 to 1-2-M for discarding signals from the input highways 1-1-1 to 1-1-M, respectively, one input one output FIFO buffers 1-3-1 to 1-3-M connected with the input highways 1-1-1 to 1-1-M, respectively, an M×1 switch 1-4 connected with outputs of the one input one output FIFO buffers 1-3-1 to 1-3-M, and an output highway 1-5 connected with an output of the M×1 switch 1-4.

In this configuration of FIG. 1, the time division signals on each of input highways 1-1-1 to 1-1-M are separately buffered by the respective one input one output FIFO buffers 1-3-1 to 1-3-M provided in correspondence to the input highways 1-1-1 to 1-1-M. The M×1 switch 1-4 selects only one of the output signals of the one input one output FIFO buffers 1-3-1 to 1-3-M and outputs the selected output signal to the output highway 1-5.

Here, each of the one input one output FIFO buffers 1-3-1 to 1-3-M can be constructed in a configuration shown in FIG. 2, as described by R. A. Thompson in "Optimizing Photonic Variable-Integer-Delay Circuits", Topical Meeting on Photonic Switching, Mar. 18–20, 1987, pp. 141–143. More specifically, this configuration of FIG. 2 comprises: an input line 2-1, 1×2 switch 2-2 connected with the input line 2-1, a signal discarding line 2-3 connected with the 1 ×2 switch 2-2, a plurality of 2×2 switches 2-4-1 to 2-4-R connected in series with the output of the 1×2 switch 2-2, loop shaped optical waveguides 2-5-1 to 2-5-R attached to the 2×2 switches 2-4-1 to 2-4-R, respectively, and an output line 2-6.

In this configuration of FIG. 2, each of the loop shaped optical waveguides 2-5-1 to 2-5-R has a circumferential length equal to a unit length for switching of the signals, such that each loop functions as one buffer. The 2×2 switches 2-4-1 to 2-4-R are controlled such that any newly arriving signal is stored in an empty loop closest to the output side, and whenever the signal stored at the last (closest to the output side) loop 2-5-R is outputted, all the other signals stored in the other loops are forwarded to next loops. The signal arriving when all the loops are filled by the signals is going to be discarded by the 1×2 switch 2-2 through the signal discarding line 2-3.

In such a conventional photonic FIFO buffer, there has been a problem that it is necessary to provide a number of loop buffers for each input highway in order to satisfy the prescribed cell loss probability, so that a large number of buffers are required in each photonic FIFO buffer.

SUMMARY OF THE INVENTION

It is therefore an object of the present invention to provide a photonic frequency division multiplexed FIFO buffer capable of realizing a multiple input one output FIFO buffer or a one input one output FIFO buffer by using only a small number of buffers.

According to one aspect of the present invention there is provided a photonic frequency division multiplexed FIFO buffer for inputting a plurality of optical signals on a plurality of time division multiplexed input highways as frequency division multiplexed input optical signals and outputting output optical signals at timeslots on a time division multiplexed output highway, comprising: splitter means for splitting the input optical signals into two; a plurality of loop shaped optical waveguide delay lines for storing the input optical signals; a plurality of 2×2 optical switch means for connecting the loop shaped optical waveguide delay lines in series with one output of the splitter means, and selectively transferring the input optical signals among the loop shaped optical waveguide delay lines; 1×2 frequency channel selector means, connected at a last stage of the loop shaped optical waveguide delay lines, for selectively outputting optical signals in specific frequency channels among the input optical signals stored by the last stage of the loop shaped optical waveguide delay lines as the output optical signals to the output highway; and buffer control means for generating a control signal for controlling a selective transferring by each of the 2×2 optical switch means and a selective outputting by the 1×2 frequency channel selector means according to another output of the splitter means.

According to another aspect of the present invention there is provided a photonic frequency division multiplexed FIFO buffer for inputting a plurality of input optical signals on a time division multiplexed input highway and outputting output optical signals at timeslots on a time division multiplexed output highway, comprising: splitter means for splitting the input optical signals into two; frequency convertor means, connected with one output of the splitter means, for converting the input optical signals into sequentially different frequency channels; a plurality of loop shaped optical waveguide delay lines for storing the input optical signals; a plurality of 2×2 optical switch means for connecting the loop shaped optical waveguide delay lines in series with an output of the frequency convertor means, and selectively transferring the input optical signals among the loop shaped optical waveguide delay lines; 1×2 frequency channel selector means, connected at a last stage of the loop shaped optical waveguide delay lines, for selectively outputting optical signals in specific frequency channels among the input optical signals stored by the last stage of the loop shaped optical waveguide delay lines as the output optical signals to the output highway; and buffer control means for generating a control signal for controlling a selective transferring by each of the 2×2 optical switch means and a selective outputting by the 1×2 frequency channel selector means according to another output of the splitter means.

Other features and advantages of the present invention will become apparent from the following description taken in conjunction with the accompanying drawings.

DETAILED DESCRIPTION OF THE PREFERRED EMBODIMENTS

Figure 1:
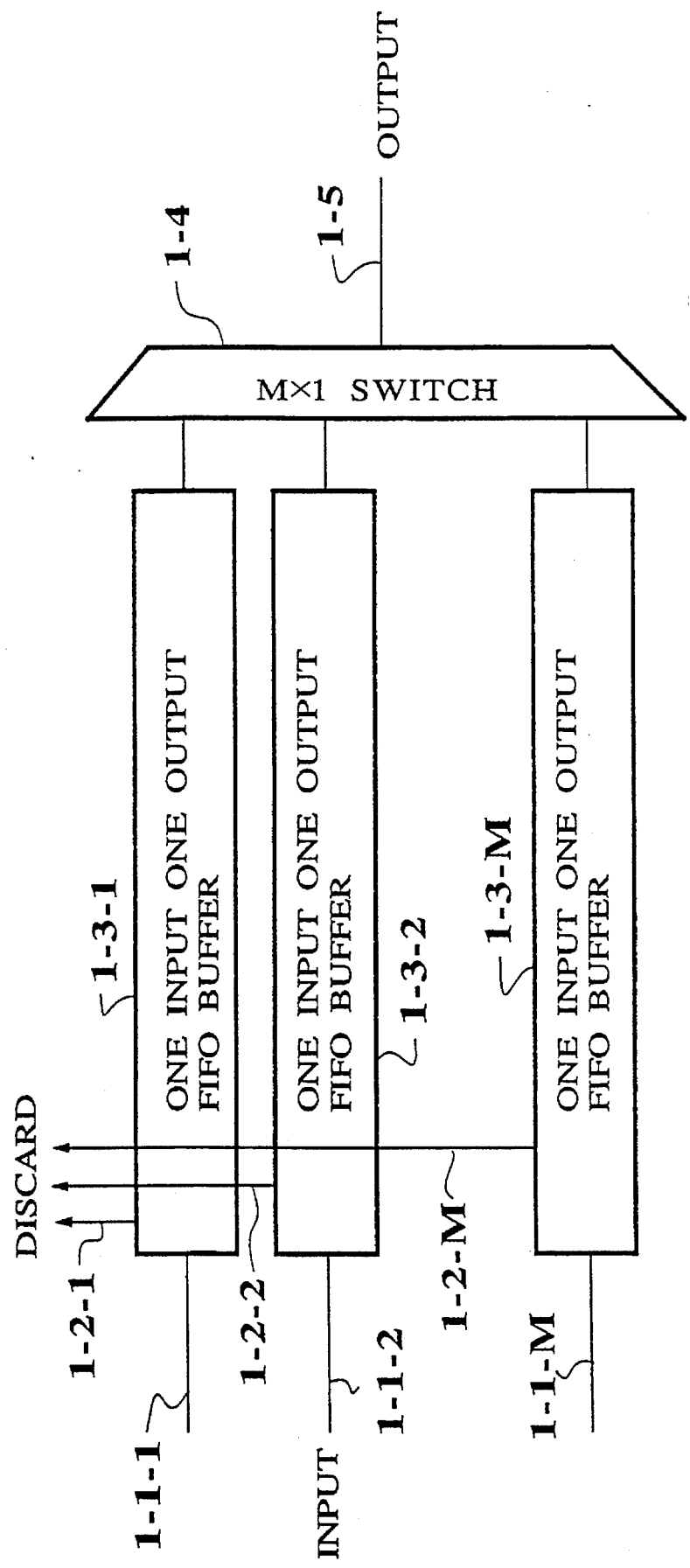
FIG. 1 is a schematic block diagram of a conventional photonic FIFO buffer.
Figure 2:
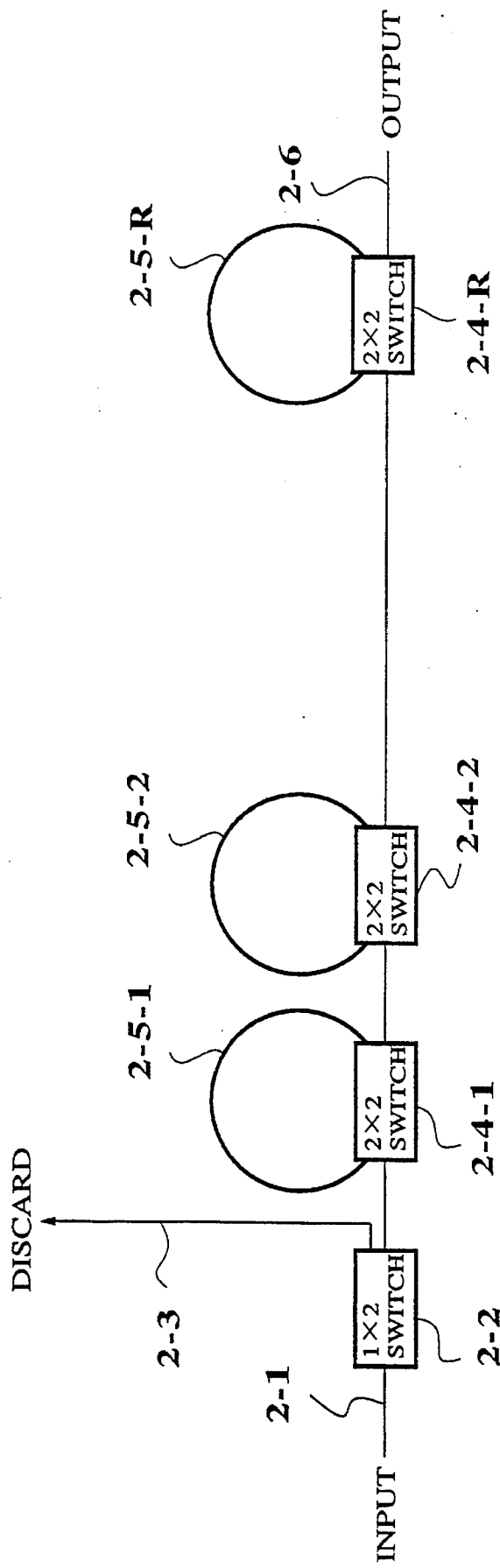
FIG. 2 is a schematic block diagram of a conventional one input one output FIFO buffer.
Figure 3:
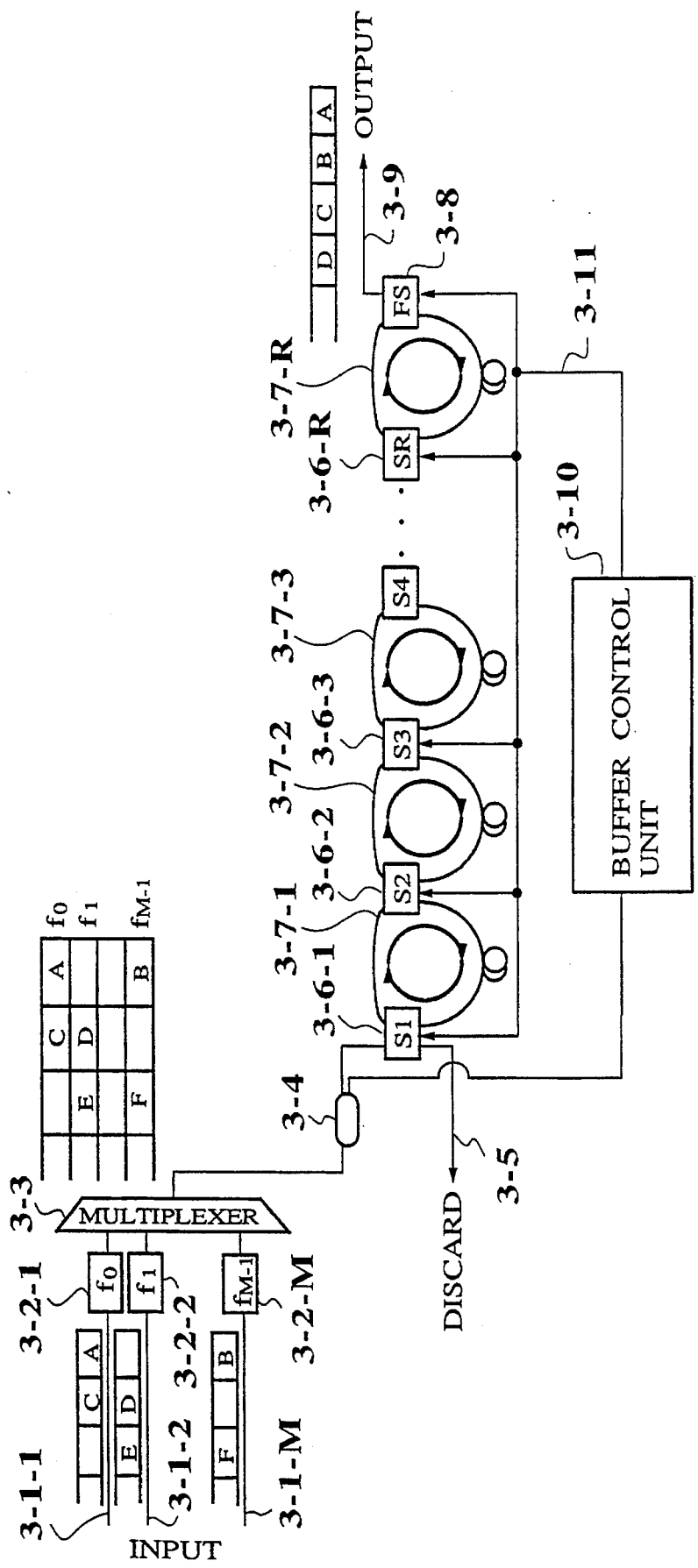
FIG. 3 is a schematic block diagram of the first embodiment of a photonic frequency division multiplexed FIFO buffer according to the present invention.

Referring now to FIG. 3, the first embodiment of the photonic frequency division multiplexed FIFO buffer according to the present invention, which realizes a multiple input one output FIFO buffer, will be described in detail.

In this first embodiment, the photonic frequency division multiplexed FIFO buffer comprises: time division multiplexed input highways 3-1-1 to 3-1-M; fixed frequency convertors 3-2-1 to 3-2-M connected with the input highways 3-1-1 to 3-1-M, respectively; a multiplexer 3-3 connected with the fixed frequency convertors 3-2-1 to 3-2-M; a signal monitor splitter 3-4 connected with an output of the multiplexer 3-3; 2×2 multi-frequency channel switches 3-6-1 to 3-6-R and a 1×2 frequency channel selector 3-8 connected in series with the splitter 3-4 by loop shaped optical waveguides 3-7-1 to 3-7-R associated with the 2×2 multi-frequency channel switches 3-6-1 to 3-6-R; a signal discarding line 3-5 connected with the first 2×2 multi-frequency channel switch 3-6-1; a time division multiplexed output highway 3-9 connected with the 1×2 frequency channel selector 3-8; and a buffer control unit 3-10 connected with the splitter 3-4 and controlling the 2×2 multi-frequency channel switches 3-6-1 to 3-6-R and the 1×2 frequency channel selector 3-8 through a control signal line 3-11.

In this configuration of FIG. 3, the optical signals on the input highways 3-1-1 to 3-1-M are allocated with the prescribed frequency channels corresponding to the respective input highways by the respective fixed frequency convertors 3-2-1 to 3-2-M provided thereon, and the converted optical signals are then frequency multiplexed by the multiplexer 3-3. The frequency multiplexed optical signals are then entered into the loop shaped optical waveguides 3-7-1 to 3-7-R through the splitter 3-4 and the 2×2 multi-frequency channel switches 3-6-1 to 3-6-R, and buffered therein.

Here, each loop shaped optical waveguide 3-7-i (i=1 to R) functions as a single buffer. When each buffer stores the frequency multiplexed signal corresponding to an empty frequency channel in the next stage buffer, the frequency multiplexed signal component in that empty frequency channel is transferred to the next stage buffer by the 2×2 multi-frequency channel switch 3-6-(i+1) provided between that each buffer and the next stage buffer. In a case the corresponding frequency channel in the next stage buffer is occupied, the frequency multiplexed signal component in that occupied frequency channel is kept in circulation at each buffer by the 2×2 multi-frequency channel switch 3-6-(i+1) provided between that each buffer and the next stage buffer. In a case the input signal in the frequency channel which is occupied in the first stage buffer 3-7-1 is entered from the splitter 3-4, that input signal in the occupied frequency channel is discarded by the first 2×2 multi-frequency channel switch 3-6-1 through the signal discarding line 3-5.

The 1×2 frequency channel selector 3-8 selectively outputs the frequency multiplexed signal component in the specific frequency channel specified by the control signal from the buffer control unit 3-10 from the last stage buffer 3-7-R to the output highway 3-9, while keeping the frequency multiplexed signal components of the other frequency channels in circulation at the last stage buffer 3-7-R.

Here, the buffer control unit 3-10 controls the operation of the 2×2 multi-frequency channel switches 3-6-1 to 3-6-R and the 1×2 frequency channel selector 3-8 as described above by monitoring in advance the buffer input signals split by the splitter 3-4. Namely, the buffer control unit 3-10 analyzes the timeslot/frequency channel occupation state of the buffer input signals, and supplies the control signals for controlling the 2×2 multi-frequency channel switches 3-6-1 to 3-6-R and the 1×2 frequency channel selector 3-8 accordingly through the control signal line 3-11. Here, the input signals from the splitter 3-4 to the first 2×2 multi-frequency channel switch 3-6-1 is appropriately delayed by a delay line (not shown) until the control signals are supplied from the buffer control unit 3-10. In this manner, the signals arrived simultaneously from the input highways 3-1-1 to 3-1-M are outputted to the output highway 3-9 at mutually different timeslots by the above described operation of the photonic frequency division multiplexed FIFO buffer of this first embodiment.

It is to be noted that the first embodiment of FIG. 3 described above can be modified such that the 2×2 multi-frequency channel switches 3-6-1 to 3-6-R are replaced by the ordinary 2×2 collective switches for switching the signals collectively. In this case, because the 2×2 collective switches only switch the signals collectively, the control of the buffer control unit 3-10 is also to be modified such that the frequency multiplexed signals are transferred forward to the next stage as long as the next stage buffer is empty, or retained in the current stage loop buffer as long as the next stage buffer is not empty, or else discarded at the first 2×2 switch 3-6-1 when the first stage loop buffer 3-7-1 is not empty.

Figure 4:
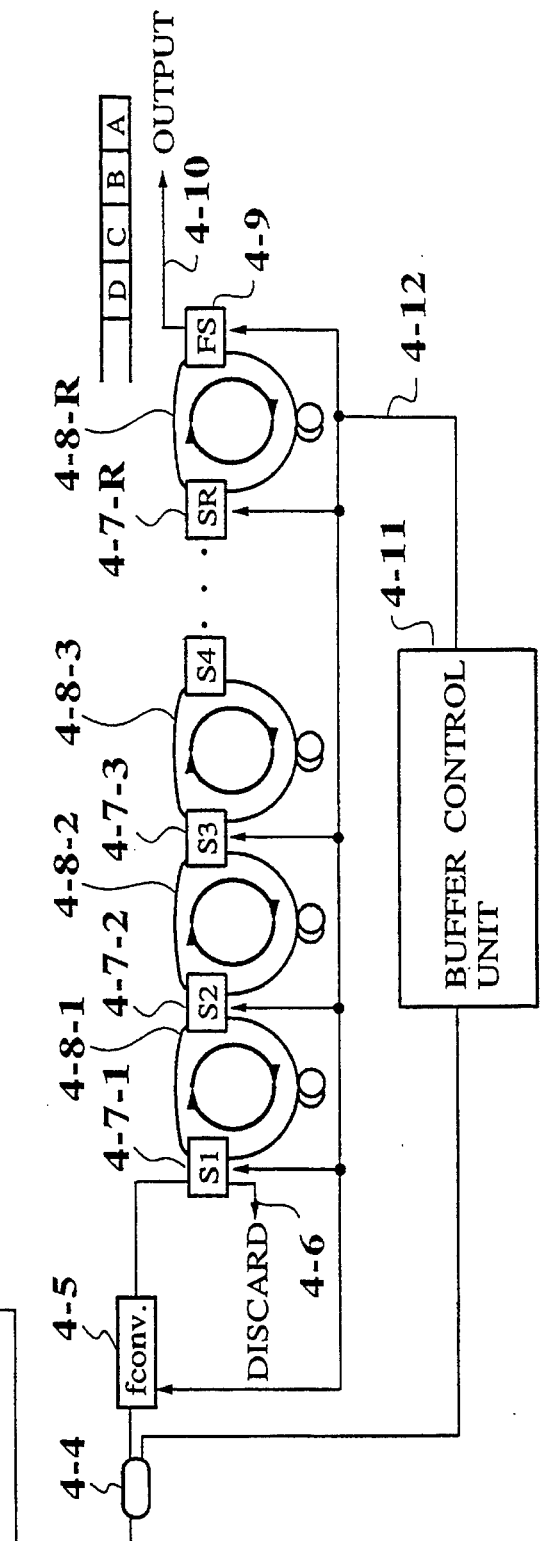
FIG. 4 is a schematic block diagram of the second embodiment of a photonic frequency division multiplexed FIFO buffer according to the present invention.

Referring now to FIG. 4, the second embodiment of the photonic frequency division multiplexed FIFO buffer according to the present invention, which also realizes a multiple input one output FIFO buffer, will be described in detail.

In this second embodiment, the photonic frequency division multiplexed FIFO buffer comprises: time division multiplexed input highways 4-1-1 to 4-1-M; fixed frequency convertors 4-2-1 to 4-2-M connected with the input highways 4-1-1 to 4-1-M, respectively; a multiplexer 4-3 connected with the fixed frequency convertors 4-2-1 to 4-2-M; a signal monitor splitter 4-4 connected with an output of the multiplexer 4-3; a frequency channel collective convertor 4-5 connected with the splitter 4-4; 2×2 frequency channel collective selectors 4-7-1 to 4-7-R and a 1×2 frequency channel selector 4-9 connected in series with the splitter 4-4 by loop shaped optical waveguides 4-8-1 to 4-8-R associated with the 2×2 frequency channel collective selectors 4-7-1 to 4-7-R; a signal discarding line 4-6 connected with the first 2×2 frequency channel collective selector 4-7-1; a time division multiplexed output highway 4-10 connected with the 1×2 frequency channel selector 4-9; and a buffer control unit 4-11 connected with the splitter 4-4 and controlling the frequency channel collective convertor 4-5, the 2×2 frequency channel collective selectors 4-7-1 to 4-7-R, and the 1×2 frequency channel selector 4-9 through a control signal line 4-12.

In this configuration of FIG. 4, the optical signals on the input highways 4-1-1 to 4-1-M are allocated with the prescribed frequency channels corresponding to the respective input highways by the respective fixed frequency convertors 4-2-1 to 4-2-M provided thereon, and the converted optical signals are then frequency multiplexed by the multiplexer 4-3. The frequency multiplexed optical signals are then entered into the loop shaped optical waveguides 4-8-1 to 4-8-R through the splitter 4-4, the frequency channel collective convertor 4-5, and the 2×2 frequency channel collective selectors 4-7-1 to 4-7-R, and buffered therein.

Here, each loop shaped optical waveguide 4-8-i (i=1 to R) functions as a single buffer. In a case a set of frequency channels having a frequency bandwidth of M channels is collectively called a band, one buffer has the effective optical bandwidth sufficient for storing a plurality of bands simultaneously. The input frequency multiplexed signals contained in a certain band are collectively converted by the frequency channel collective convertor 4-5 into an arbitrary unused band within the effective optical bandwidth of the first stage buffer 4-8-1. When each buffer stores the band corresponding to an empty band in the next stage buffer among a plurality of bands stored within each buffer, the frequency multiplexed signals of that empty band are collectively transferred to the next stage buffer by the 2×2 frequency channel collective selector 4-7-(i+1) provided between that each buffer and the next stage buffer, while keeping the frequency multiplexed signals of the other bands in circulation at each buffer.

The last 2×2 frequency channel collective selector 4-7-R is controlled such that the last stage buffer 4-8-R has only one band of the frequency multiplexed signals. The 1×2 frequency channel selector 4-9 then selectively outputs the frequency multiplexed signal component in the specific frequency channel specified by the control signal from the buffer control unit 4-11 from the last stage buffer 4-8-R to the output highway 4-10, while keeping the frequency multiplexed signal components of the other frequency channels in circulation at the last stage buffer 4-8-R.

In a case the effective optical bandwidth of the first stage buffer 4-8-1 is totally occupied, the entered input signals are discarded by the first 2×2 frequency channel collective selector 4-7-1 through the signal discarding line 4-6.

Here, the buffer control unit 4-11 controls the operation of the frequency channel collective convertor 4-5, the 2×2 frequency channel collective selectors 4-7-1 to 4-7-R, and the 1×2 frequency channel selector 4-9 as described above by monitoring in advance the buffer input signals split by the splitter 4-4. Namely, the buffer control unit 4-11 analyzes the timeslot/band/frequency channel occupation state of the buffer input signals, and supplies the control signals for controlling the frequency channel collective convertor 4-5, the 2×2 frequency channel collective selectors 4-7-1 to 4-7-R and the 1×2 frequency channel selector 4-9 accordingly through the control signal line 4-12. Here, the input signals from the splitter 4-4 to the frequency channel collective convertor 4-5 is appropriately delayed by a delay line (not shown) until the control signals are supplied from the buffer control unit 4-11. In this manner, the signals arrived simultaneously from the input highways 4-1-1 to 4-1-M are outputted to the output highway 4-10 at mutually different timeslots by the above described operation of the photonic frequency division multiplexed FIFO buffer of this second embodiment.

Figure 5:
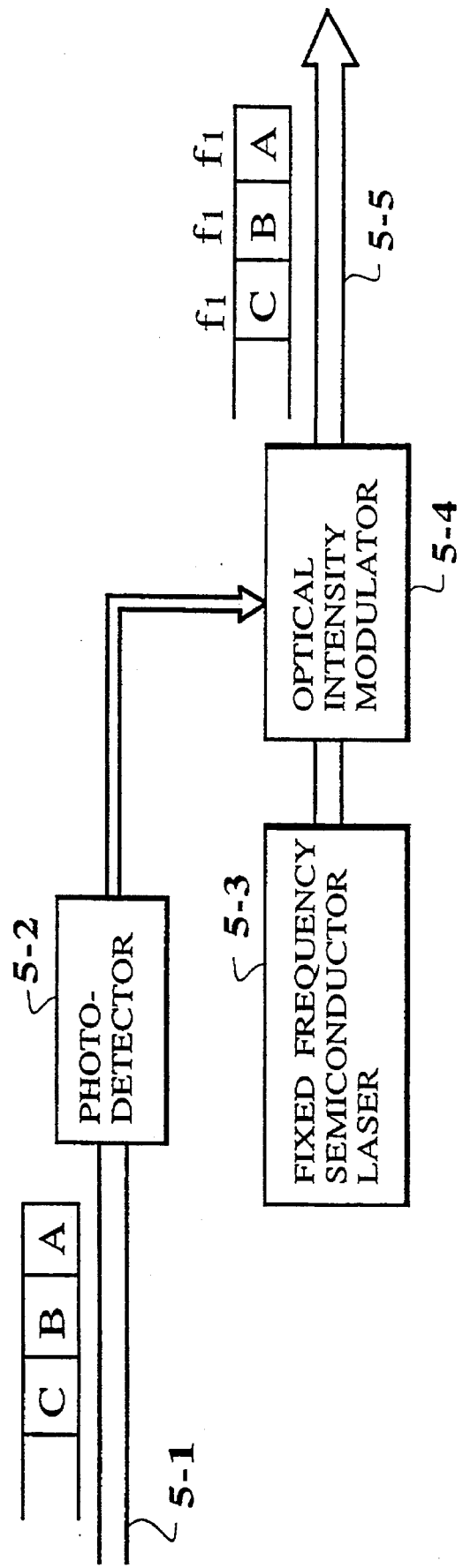
FIG. 5 is a block diagram of a fixed frequency convertor used in the first embodiment of FIG. 3 and the second embodiment of FIG. 4.

In the first and second embodiments described above, each of the fixed frequency convertors 3-2-1 to 3-2-M in FIG. 3 and 4-2-1 to 4-2-M in FIG. 4 has an exemplary configuration as shown in FIG. 5, which comprises an input highway 5-1 before the frequency conversion, a photo-detector 5-2 connected with the input highway 5-1, a fixed frequency semiconductor laser 5-3; an optical intensity modulator 5-4 connected with the photo-detector 5-2 and the fixed frequency semiconductor laser 5-3; and an input highway 5-5 after the frequency conversion which is connected with the optical intensity modulator 5-4.

In this configuration of FIG. 5, time division signals entered from the input highway 5-1 are converted into high speed electrical signals by the photo-detector 5-2, and the obtained electrical signals are then used for driving the optical intensity modulator 5-4. On the other hand, the fixed frequency semiconductor laser 5-3 generates a laser beam of the prescribed fixed frequency and supplies the generated laser beam to the optical intensity modulator 5-4. Then, the laser beam supplied from the fixed frequency semiconductor laser 5-3 is modulated at the optical intensity modulator 5-4 according to the electrical signals supplied from the photo-detector 5-2.

Here, it is possible to construct the entire frequency convertor optically if it is possible to use an optically controllable optical intensity modulator, or a fixed frequency semiconductor laser that can be optically controlled to directly modulate the generated laser beam.

Figure 6:
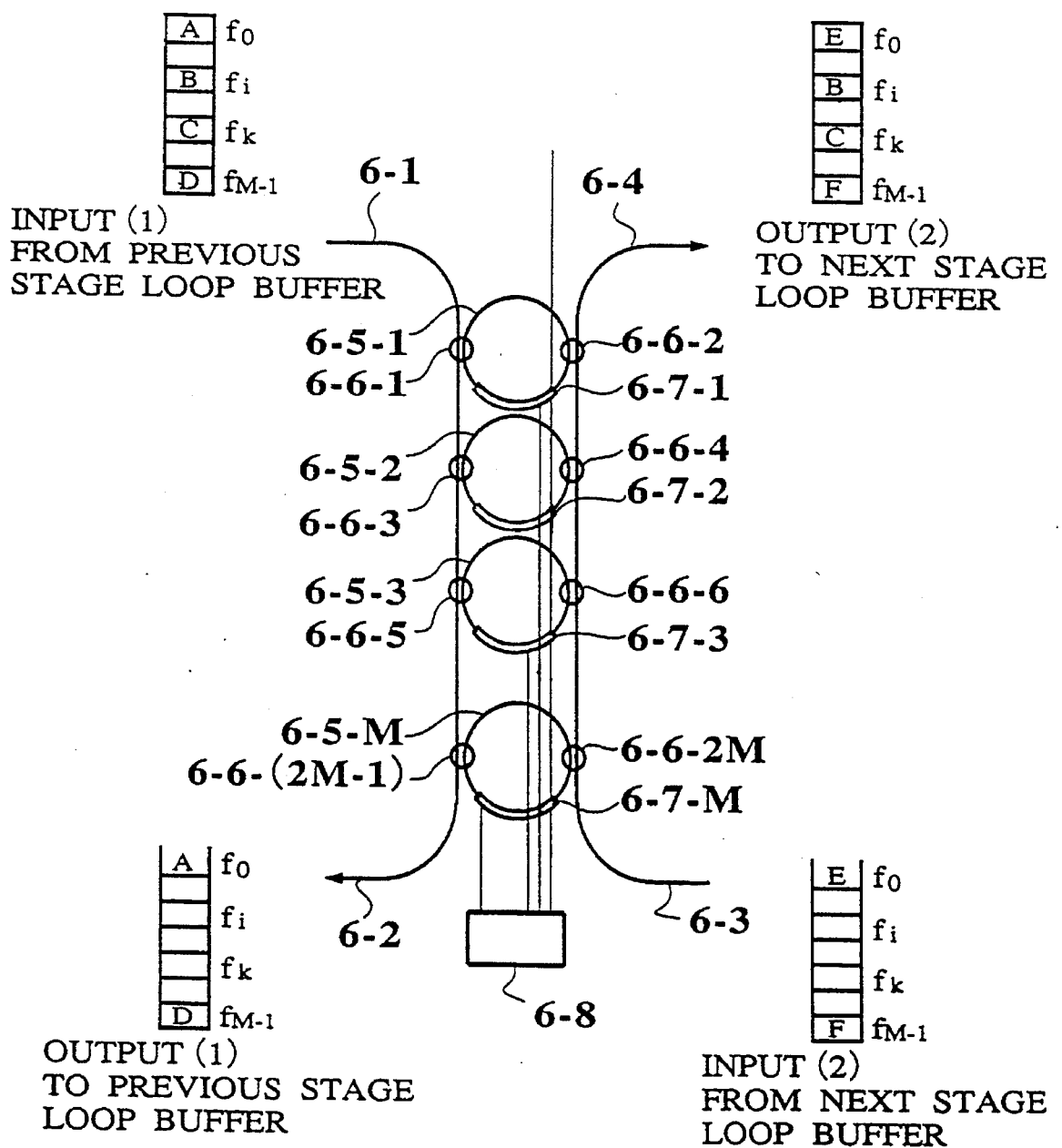
FIG. 6 is a block diagram of a 2×2 multi-frequency channel switch used in the first embodiment of FIG. 3.

In the first embodiment described above, each of the 2×2 multi-frequency channel switches 3-6-1 to 3-6-R has an exemplary configuration shown in FIG. 6, which comprises: an input port (1) 6-1 connected with the previous stage loop buffer; an output port (1) 6-2 connected with the previous stage loop buffer; an input port (2) 6-3 connected with the next stage loop buffer; an output port (2) 6-4 connected with the next stage loop buffer; M pieces of ring shaped optical resonators 6-5-1 to 6-5-M connected with a line joining the input port (1) 6-1 and the output port (1) 6-2 and a line joining the input port (2) 6-3 and the output port (2) 6-4 through 2M pieces of directional couplers 6-6-1 to 6-6-2M; M pieces of phase shifters 6-7-1 to 6-7-M attached to the ring shaped optical resonators 4-5-1 to 4-5-M, respectively; and a phase shifter setting power source 6-8 connected with the phase shifters 6-7-1 to 6-7-M.

In this configuration of FIG. 6, among the frequency multiplexed signals entering from the input port (1) 6-1, the signals of the frequency channels which coincide with the resonance frequencies of the ring shaped optical resonators 6-5-1 to 6-5-M are outputted to the output port (2) 6-4, while the signals of the other frequency channels are outputted from the output port (1) 6-2. Here, each resonance frequency is determined by the optical path length of each one of the ring shaped optical resonators 6-5-1 to 6-5-M, and can be adjusted to any desired frequency channel by changing the optical path length of each one of the ring shaped optical resonators 6-5-1 to 6-5-M by the respective phase shifters 6-7-1 to 6-7-M. Here, the phase shifting amount of each of the phase shifters 6-7-1 to 6-7-M is adjusted at each timeslot by the phase shifter setting power source 6-8, such that the frequency channels can be selected at high speed. In this manner, the signals of the desired frequency channels for each timeslot alone are selectively outputted to the next stage loop buffer, while the signals of the other frequency channels are returned to the previous stage loop buffer.

Figure 7:
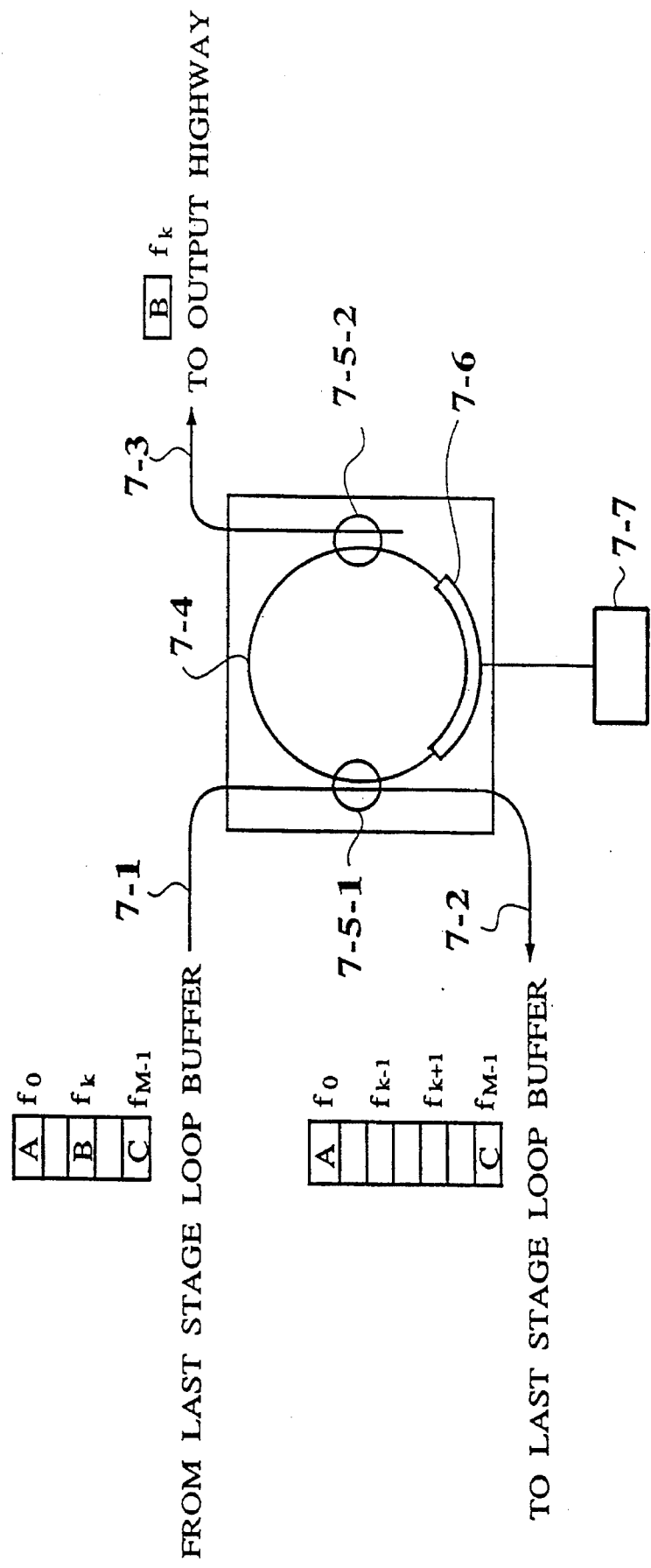
FIG. 7 is a block diagram of a 1×2 frequency channel selector used in the first embodiment of FIG. 3 and the second embodiment of FIG. 4.

In the first and second embodiments described above, the 1×2 frequency channel selector 3-8 in FIG. 3 and 4-9 in FIG. 4 has an exemplary configuration shown in FIG. 7, which comprises: an input port 7-1 connected with the last stage loop buffer; an output port (1) 7-2 connected with the last stage loop buffer; an output port (2) 7-3 connected with the output highway; a ring shaped optical resonator 7-4 connected with a line joining the input port 7-1 and the output port (1) 7-2 and a line connected to the output port (2) 7-3 through directional couplers 7-5-1 and 7-5-2; a phase shifter 7-6 attached to the ring shaped optical resonator 7-4; and a phase shifter setting power source 7-7 connected with the phase shifter 7-6.

In this configuration of FIG. 7, among the frequency multiplexed signals entering from the input port 7-1, the signal of the frequency channel which coincides with the resonance frequency of the ring shaped optical resonator 7-4 is outputted to the output port (2) 7-3, while the signals of the other frequency channels are outputted from the output port (1) 7-2. Here, the resonance frequency is determined by the optical path length of the ring shaped optical resonator 7-4, and can be adjusted to any desired frequency channel by changing the optical path length of the ring shaped optical resonator 7-4 by the phase shifter 7-6. Here, the phase shifting amount of the phase shifter 7-6 is adjusted at each timeslot by the phase shifter setting power source 7-7, such that the frequency channel can be selected at high speed. In this manner, the signal of the desired frequency channel for each timeslot alone is selectively outputted to the output highway, while the signals of the other frequency channels are returned to the last stage loop buffer.

In the first and second embodiment described above, the buffer control unit 3-10 in FIG. 3 and 4-11 in FIG. 4 has an exemplary configuration as shown in FIG. 8, which comprises: a monitoring signal line 8-1 from the splitter 3-4 or 4-4; a 1×M demultiplexer 8-2 connected with the monitoring signal line 8-1; M pieces of photo-detectors 8-3-1 to 8-3-M connected with M outputs of the 1×M demultiplexer 8-2; M memory elements 8-4-1 to 8-4-M, connected with the photo-detectors 8-3-1 to 8-3-M, for storing the channel occupation state of the buffer input signals; and a selector 8-5, connected with the memory elements 8-4-1 to 8-4-M, for outputting a buffer output selection signal; and a control signal line 8-6 connected between the selector 8-5 and the control signal line 3-11 or 4-12.

Figure 8:
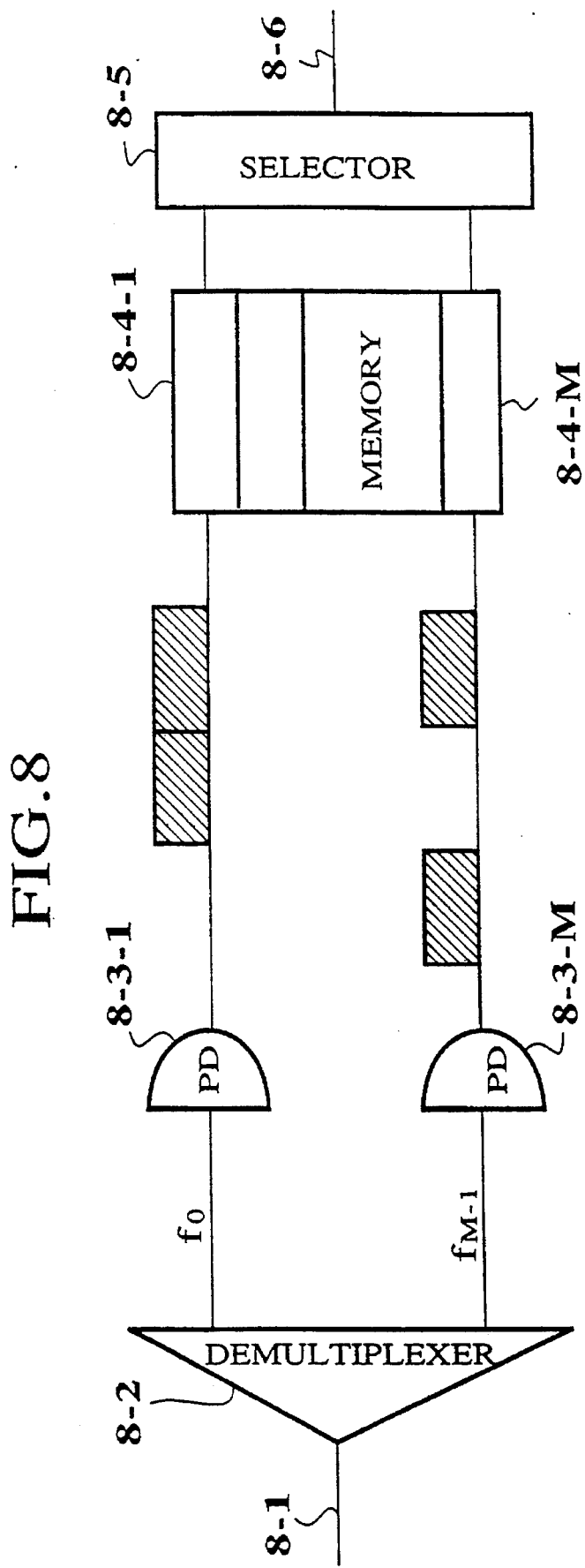
FIG. 8 is a block diagram of a buffer control unit used in the first embodiment of FIG. 3 and the second embodiment of FIG. 4.

In this configuration of FIG. 8, the monitoring signals entered from the monitoring signal line 8-1 are demultiplexed into those coming from the different input highways by the demultiplexer 8-2. The demultiplexed signals are then converted into the electrical signals by the photo-detectors 8-3-1 to 8-3-M, and stored in the respective memory elements 8-4-1 to 8-4-M for storing the channel occupation states of the buffer input signals indicating which timeslots of which frequency channels are occupied. Then, the selector 8-5 outputs the buffer output selection signal through the control signal line 8-6 according to the channel occupation states stored in the memory elements 8-4-1 to 8-4-M, such that the stored signals can be outputted to the output highway sequentially one by one.

Figure 9:
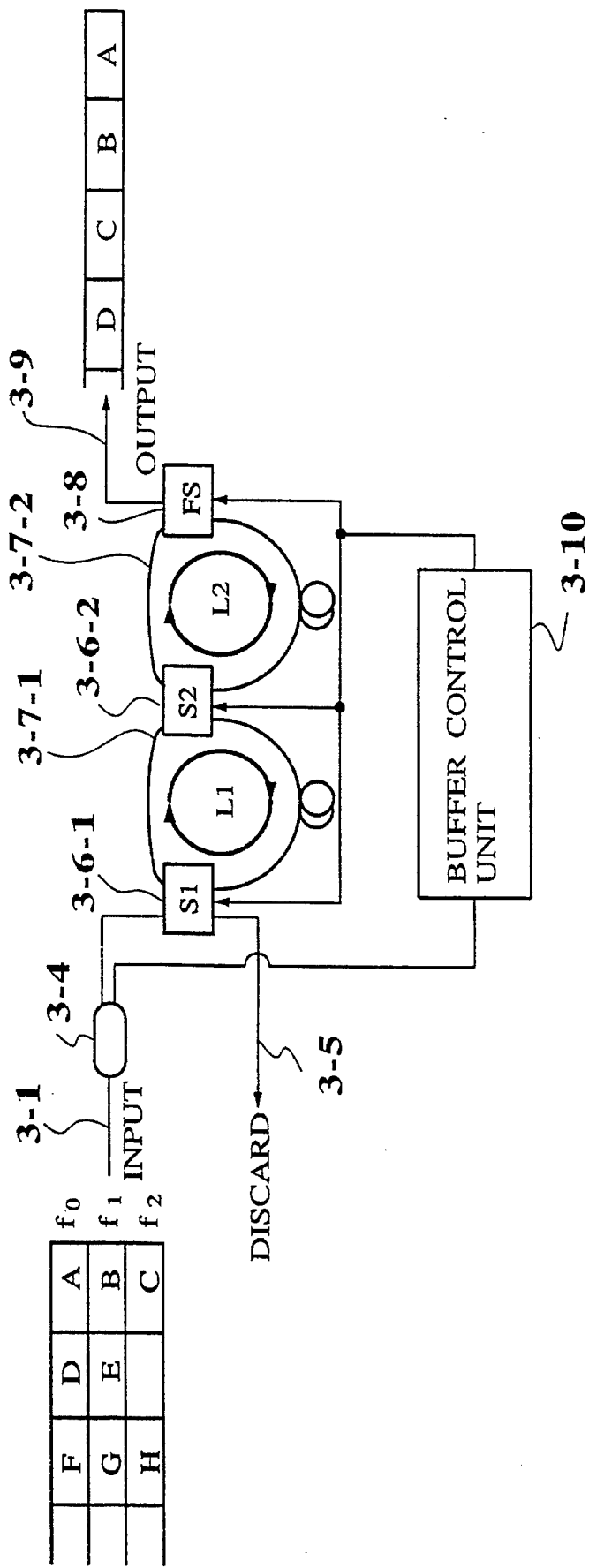
FIG. 9 is a block diagram of an exemplary simplified buffer configuration in accordance with the first embodiment of FIG. 3.
Figure 10:
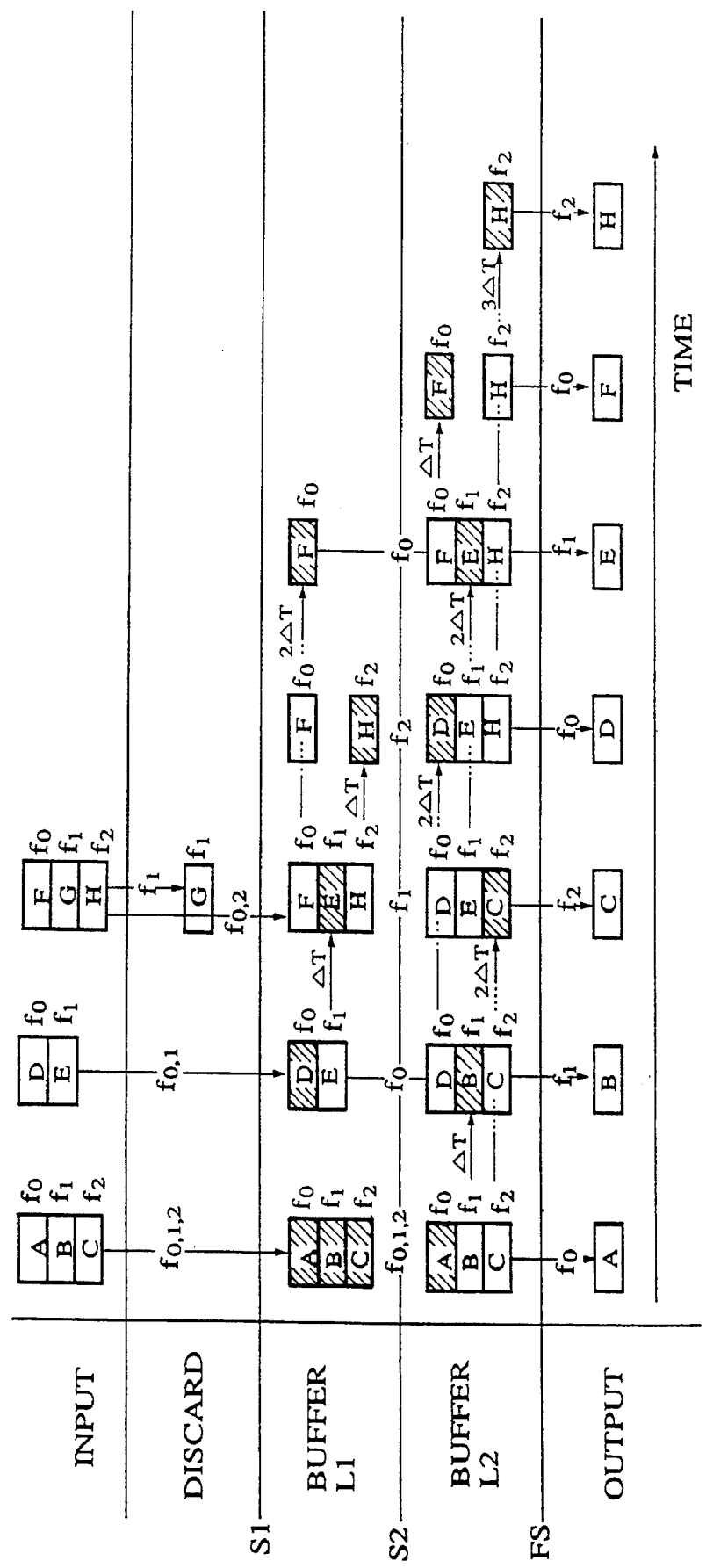
FIG. 10 is the timing chart for the operation in the exemplary simplified buffer configuration of FIG. 9.

Now, FIG. 9 shows an exemplary simplified buffer configuration with only two loops in accordance with the first embodiment of FIG. 3 described above, in which the buffer control unit 3-10 carries out the control according to the timing chart of FIG. 10 as follows. Here, the frequency multiplexed signals A to H are entered as indicated in FIG. 9 and FIG. 10.

First, when the signals A, B, and C in the frequency channels f0, f1, and f2, respectively, are entered, these signals A, B, and C are stored in the loop buffer (L2) 3-7-2 through the 2×2 multi-frequency channel switches (S1, S2) 3-6-1 and 3-6-2, while at the same time, the signal A is outputted to the output highway 3-9 by the 1×2 frequency channel selector (FS) 3-8.

Then, the next input signals D and E in the frequency channels f0 and f1 are entered into the loop buffer (L1) 3-6-1, and at the same time the signal D is transferred to the loop buffer (L2) 3-7-2 through the 2×2 multi-frequency channel switch (S2) 3-6-2 and stored therein, as the frequency channel f0 of this signal D becomes empty in the loop buffer (L2) 3-7-2 after the signal A of this frequency channel f0 has been outputted. Then, the signal B stored in the loop buffer (L2) 3-7-2 is outputted to the output highway 3-9 by the 1×2 frequency channel selector (FS) 3-8.

Next, among the next input signals F, G, and H in the frequency channels f0, f1, and f2, respectively, the signals F and H are stored in the loop buffer (L1) 3-6-1 as their frequency channels f0 and f2 are empty in the loop buffer (L1) 3-6-1, but the signal G is discarded as it cannot be entered into the loop buffer (L1) 3-6-1 as its frequency channel f1 is occupied by the signal E in the loop buffer (L1) 3-6-1. Then, the signal E is transferred to the loop buffer (L2) 3-7-2 through the 2×2 multi-frequency channel switch (S2) 3-6-2 and stored therein, as the frequency channel f1 of this signal E becomes empty in the loop buffer (L2) 3-7-2 after the signal B of this frequency channel f1 has been outputted, while the signal C stored in the loop buffer (L2) 3-7-2 is outputted to the output highway 3-9 by the 1×2 frequency channel selector (FS) 3-8.

Hereafter, the similar operation is carried under the control of the buffer control unit 3-10 such that the signal is transferred forward to the next stage as long as its frequency channel is empty in the next stage, or retained in the current stage loop buffer as long as its frequency channel is occupied in the next stage.

Figure 11:
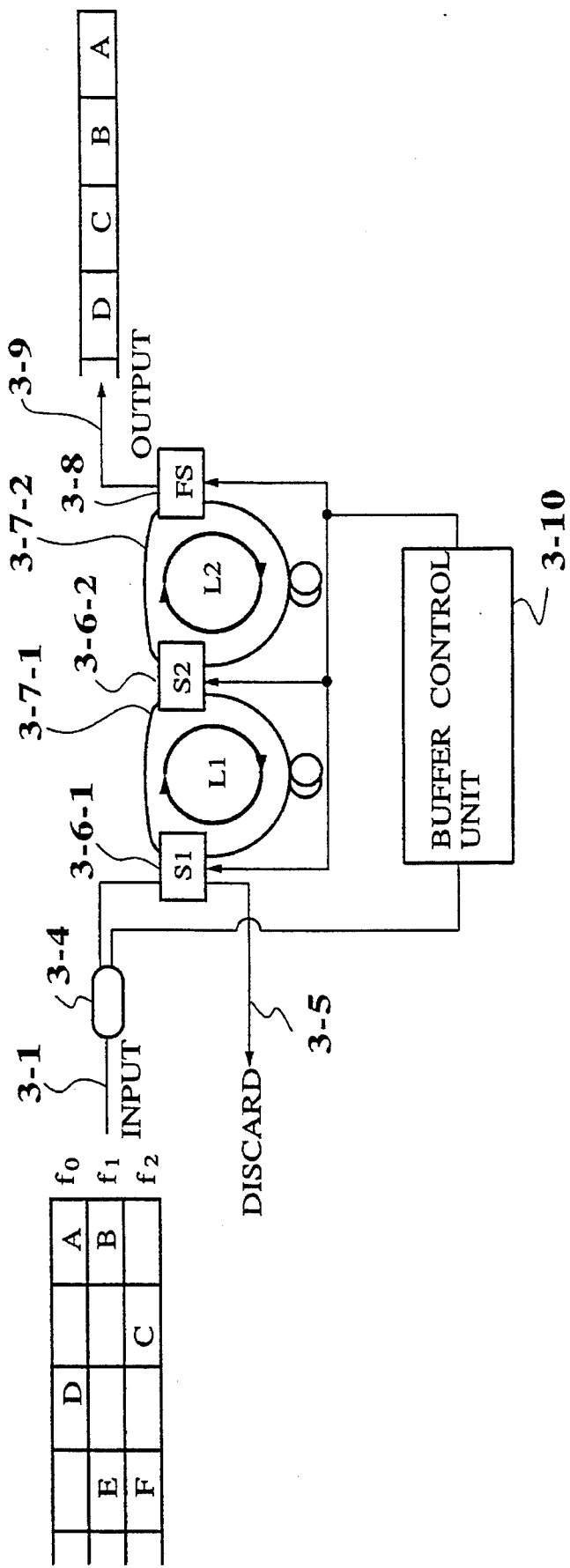
FIG. 11 is a block diagram of another exemplary simplified buffer configuration in accordance with the first embodiment of FIG. 3 using different input signals.
Figure 12:
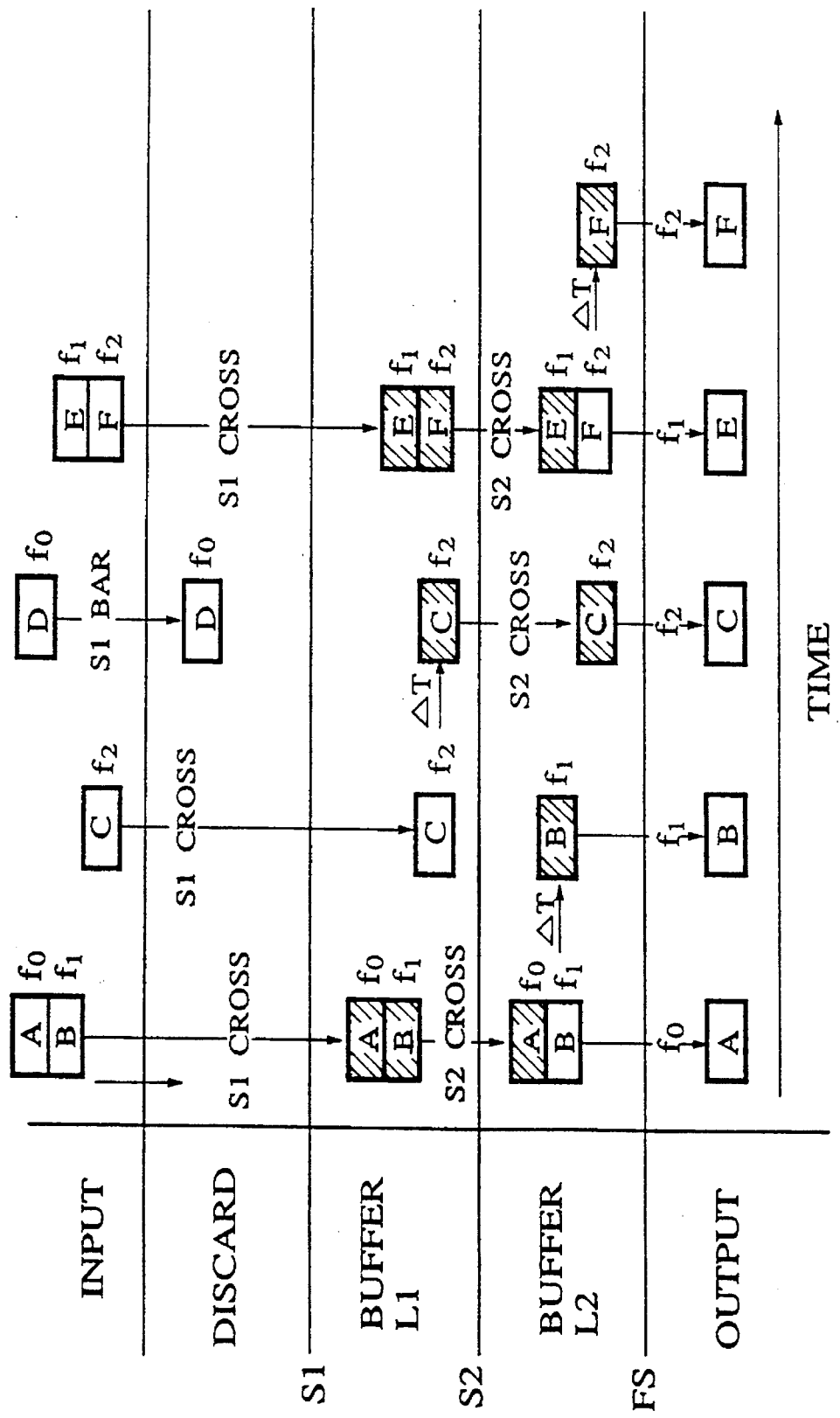
FIG. 12 is the timing chart for the operation in the exemplary simplified buffer configuration of FIG. 11.

Similarly, FIG. 11 shows an exemplary simplified buffer configuration with only two loops in accordance with the above described modification of the first embodiment of FIG. 3 using the ordinary 2×2 collective switches described above, in which the buffer control unit 3-10 carries out the different control according to the timing chart of FIG. 12 as follows. Here, the frequency multiplexed signals A to F are entered as indicated in FIG. 11 and FIG. 12.

First, when the signals A and B in the frequency channels f0 and f1, respectively, are entered, these signals A and B are stored in the loop buffer (L1) 3-7-1 by setting the 2×2 collective switch (S1) 3-6-1 in the cross state. Then, the next input signal C in the frequency channel f2 is also stored in the loop buffer (L1) 3-7-1 by setting the 2×2 collective switch (S1) 3-6-1 in the cross state, while the signals A and B are stored in the loop buffer (L2) 3-7-2 by setting the 2×2 collective switch (S2) 3-6-2 in the cross state.

At the next timeslot, among the signals A and B stored in the loop buffer (L2) 3-7-2, only the signal A is selectively outputted to the output highway 3-9 by the 1×2 frequency channel selector (FS) 3-8, while the other signal B is stored again in the loop buffer (L2) 3-7-2. At this point, the signal C in the loop buffer (L1) 3-7-1 is also stored again in the loop buffer (L1) 3-7-1 by setting the 2×2 collective switch (S2) 3-6-2 in the bar state, while the next input signal D in the frequency-channel f0 is discarded through the signal discarding line 3-5 by setting the 2×2 collective switch (S1) 3-6-1 in the bar state.

At the next timeslot, the signal B in the loop buffer (L2) 3-7-2 is selectively outputted to the output highway 3-9 by the 1×2 frequency channel selector (FS) 3-8, while the signal C in the loop buffer (L1) 3-7-1 is also transferred to the loop buffer (L2) 3-7-2 by setting the 2×2 collective switch (S2) 3-6-2 in the cross state, and the next input signals E and F in the frequency channels f1 and f2, respectively, are stored in the loop buffer (L1) 3-7-1 by setting the 2×2 collective switch (S1) 3-6-1 in the cross state.

Hereafter, the similar operation is carried under the control of the buffer control unit 3-10 such that the frequency multiplexed signals are transferred forward to the next stage by setting the 2×2 collective switch in the cross state as long as the next stage buffer is empty; or retained in the current stage loop buffer as long as the next stage buffer is not empty by setting the 2×2 collective switch in the bar state, or else discarded by setting the first 2×2 collective switch 3-6-1 in the bar state when the first stage loop buffer (L1) 3-7-1 is not empty.

Figure 13:
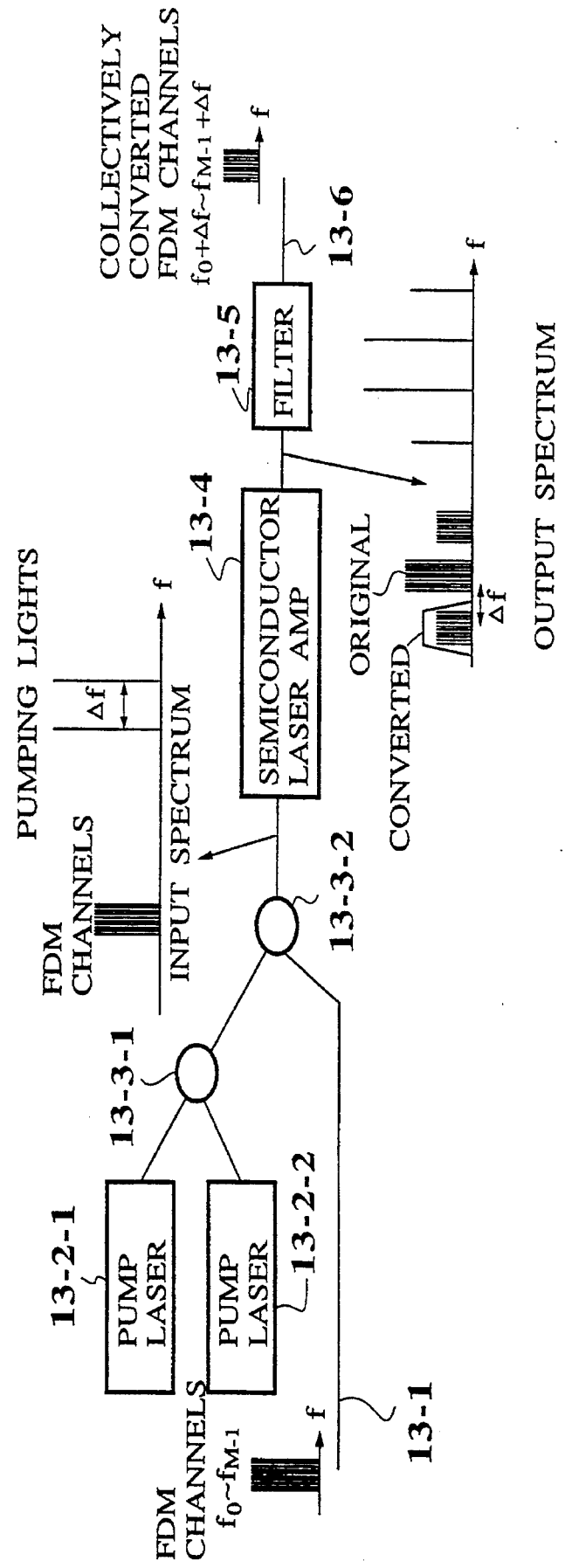
FIG. 13 is a block diagram of a frequency channel collective convertor used in the second embodiment of FIG. 4.

In the second embodiment described above, the frequency channel collective convertor 4-5 in FIG. 4 has an exemplary configuration as shown in FIG. 13, which comprises: an input line 13-1 before the collective frequency conversion; pump lasers 13-2-1 and 13-2-2; a directional coupler 13-3-1 for coupling the outputs of the pump lasers 13-2-1 and 13-2-2; a directional coupler 13-3-2 for coupling the output of the directional coupler 13-3-1 and the input signals from the input line 13-1; a semiconductor laser amplifier 13-4 connected with the output of the directional coupler 13-3-2; a filter 13-5 connected with the output of the semiconductor laser amplifier 13-4; and an output line 13-6 connected with the output of the filter 13-5. This configuration has been disclosed in detail by R. Schnabel et al. in "Polarization Insensitive Frequency Conversion of a 10-Channel OFDM Signal Using Four-Wave-Mixing in a Semiconductor Laser Amplifier". IEEE Photonics Technology Letters, Vol. 6, No. 1, pp. 56–58, January 1994.

In this configuration of FIG. 13, the frequency multiplexed signals from the input line 13-1 and the CW pumping lights from the pump lasers 13-2-1 and 13-2-2 are entered into the semiconductor laser amplifier 13-4 through the directional couplers 13-3-1 and 13-3-2. At the semiconductor laser amplifier 13-4, the frequency conversion is made by using four-wave-mixing, and the FDM (Frequency Division Multiplexed) channels are collectively converted as much as the frequency difference of two pumping lights as indicated by the output spectrum shown in FIG. 13.

Then, the collectively converted signals alone are selectively outputted to the output line 13-6 by means of the filter 13-5.

Figure 14:
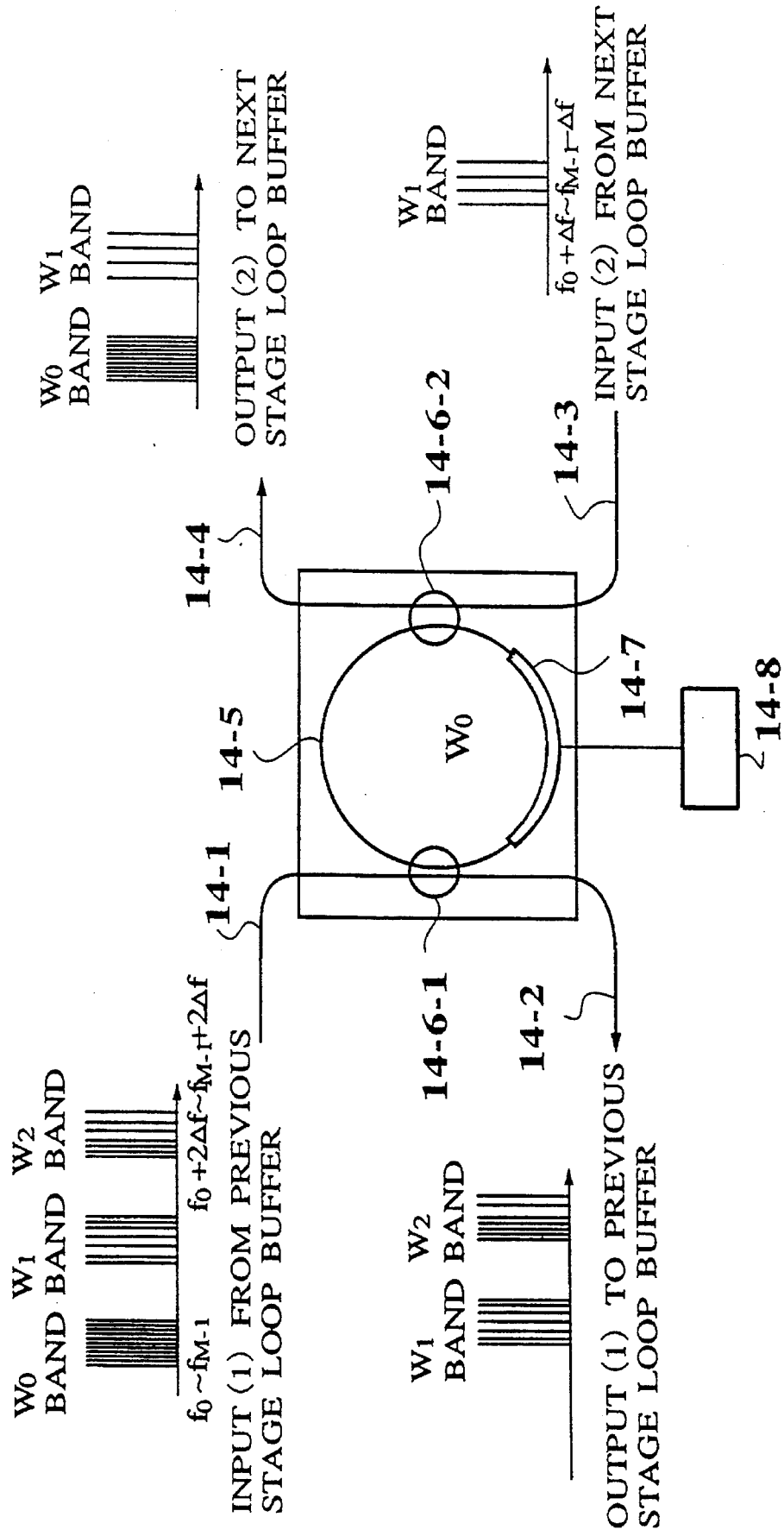
FIG. 14 is a block diagram of a 2×2 frequency channel collective selector used in the second embodiment of FIG. 4.

In the second embodiment described above, each of the 2×2 frequency channel collective selectors 4-7-1 to 4-7-R has an exemplary configuration shown in FIG. 14, which comprises: an input port (1) 14-1 connected with the previous stage loop buffer; an output port (1) 14-2 connected with the previous stage loop buffer; an input port (2) 14-3 connected with the next stage loop buffer; an output port (2) 14-4 connected with the next stage loop buffer; a ring shaped optical resonator 14-5 connected with a line joining the input port (1) 14-1 and the output port (1) 14-2 and a line joining the input port (2) 14-3 and the output port (2) 14-4 through directional couplers 14-6-1 and 14-6-2; a phase shifter 14-7 attached to the ring shaped optical resonator 14-5; and a phase shifter setting power source 14-8 connected with the phase shifters 14-7.

In this configuration of FIG. 14, among a plurality of bands entering from the input port (1) 14-1, only the band which coincides with the resonance frequency band of the ring shaped optical resonator 14-5 is outputted to the output port (2) 14-4, while the other bands are outputted from the output port (1) 14-2. Here, the resonance frequency band is determined by the optical path length of the ring shaped optical resonators 14-5, and can be adjusted to any desired band by changing the optical path length of the ring shaped optical resonator 14-5 by the phase shifter 14-7. Here, the phase shifting amount of the phase shifter 14-7 is adjusted at each timeslot by the phase shifter setting power source 14-8, such that the frequency channels can be selected at high speed. In this manner, the desired band for each timeslot alone is selectively outputted to the next stage loop buffer, while the other bands are returned to the previous stage loop buffer.

Figure 15:
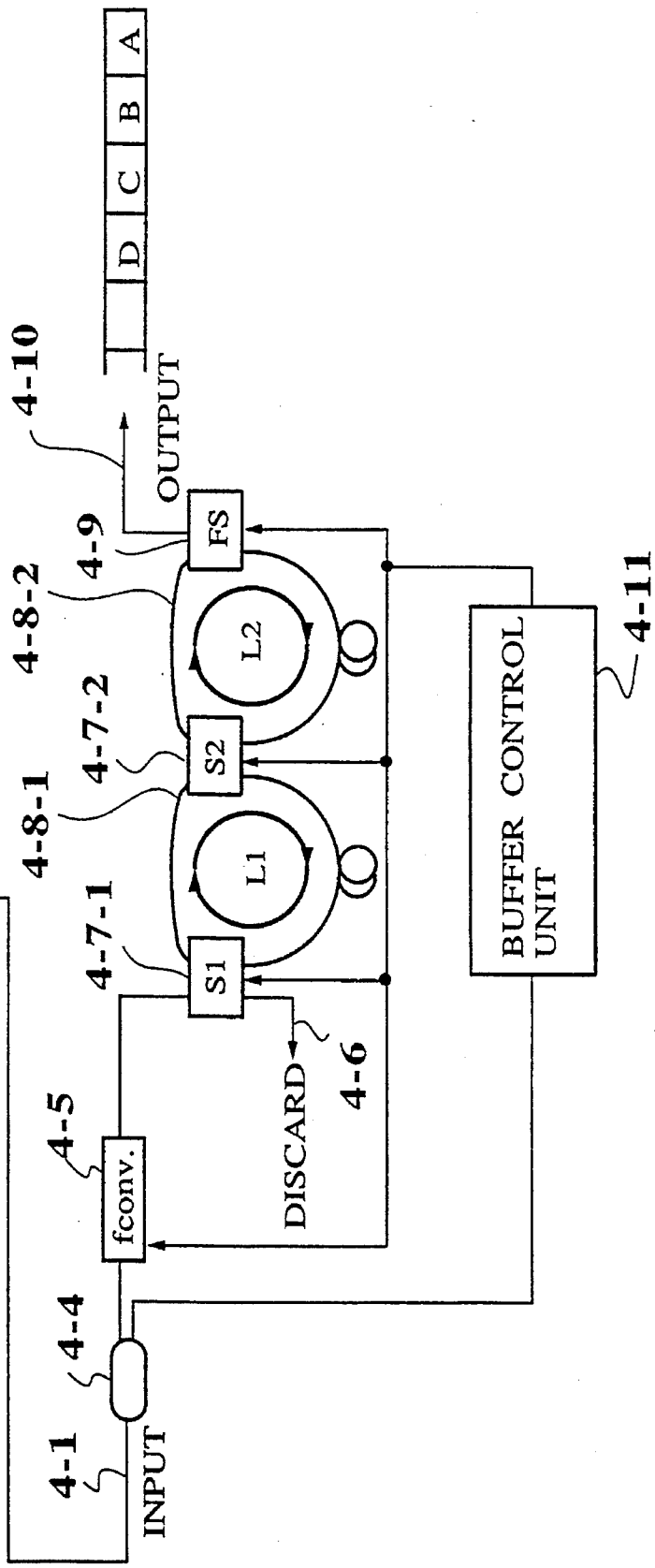
FIG. 15 is a block diagram of an exemplary simplified buffer configuration in accordance with the second embodiment of FIG. 4.
Figure 16:
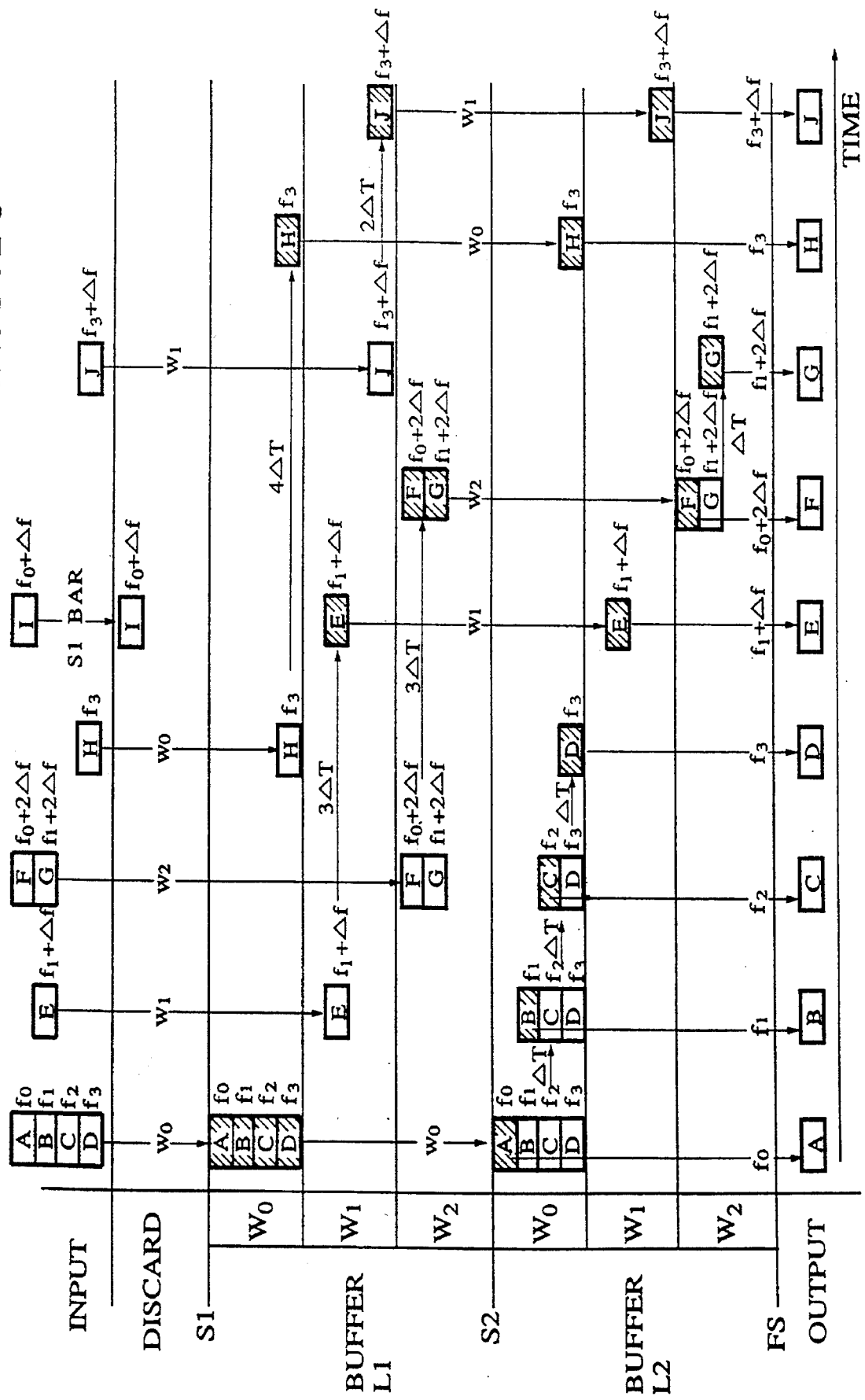
FIG. 16 is the timing chart for the operation in the exemplary simplified buffer configuration of FIG. 15.

Now, FIG. 15 shows an exemplary simplified buffer configuration with only two loops in accordance with the second embodiment of FIG. 4 described above, in which the buffer control unit 4-11 carried out the control according to the timing chart of FIG. 16 as follows. Here, the frequency multiplexed signals A to J are entered as indicated in FIG. 15 and FIG. 16, and it is assumed that each loop buffer can store at most three bands simultaneously.

First, when the signals A, B, C, and D in the frequency channels f0, f1, f2, and f3, respectively, are entered, these signals A, B, C, and D are collectively converted into the band W0 by the frequency channel collective converter 4-5, and stored in the loop buffer (L2) 4-8-2 through the 2×2 frequency channel collective selectors (S1, S2) 4-7-1 and 4-7-2, while at the same time, the signal A is outputted to the output highway 4-10 by the 1×2 frequency channel selector (FS) 4-9.

Then, the next input signal E in the frequency channel f1 is collectively converted into the band W1 by the frequency channel collective converter 4-5, and stored in the loop buffer (L1) 4-8-1 through the 2×2 frequency channel collective selector (S1) 4-7-1. Similarly, the subsequent input signals F and G in the frequency channels f0 and f1 are collectively converted into the band W2 while the subsequent input signal H in the frequency channel f3 is collectively converted into the band W0 and these bands W0 and W2 are stored in the loop buffer (L1) 4-8-1. As for the subsequent input signal I in the frequency channel in f0 is discarded as the effective optical bandwidth of the loop buffer (L1) 4-8-1 are totally occupied. After all the signals A, B, C, and D originally stored in the loop buffer (L2) 4-8-2 are outputted to the output highway 4-10, the next signals E, F, G, and H are sequentially transferred from the loop buffer (L1) 4-8-1 to the loop buffer (L2) 4-8-2 through the 2×2 frequency channel collective selector (S2) 4-7-2, and then sequentially outputted to the output highway 4-10.

Hereafter, the similar operation is carried under the control of the buffer control unit 4-11 such that the band is transferred forward to the next stage as long as there is an empty band in the next stage, or retained in the current stage loop buffer as long as all the bands are occupied in the next stage.

As described, according to the first and second embodiments of the present invention, a plurality of the time division multiplexed optical signals are frequency multiplexed, and the frequency multiplexed signals are collectively buffered by the loop shaped optical waveguide delay lines, so that the multiple input one output FIFO buffer can be constructed economically by using only a small number of buffers.

Figure 17:
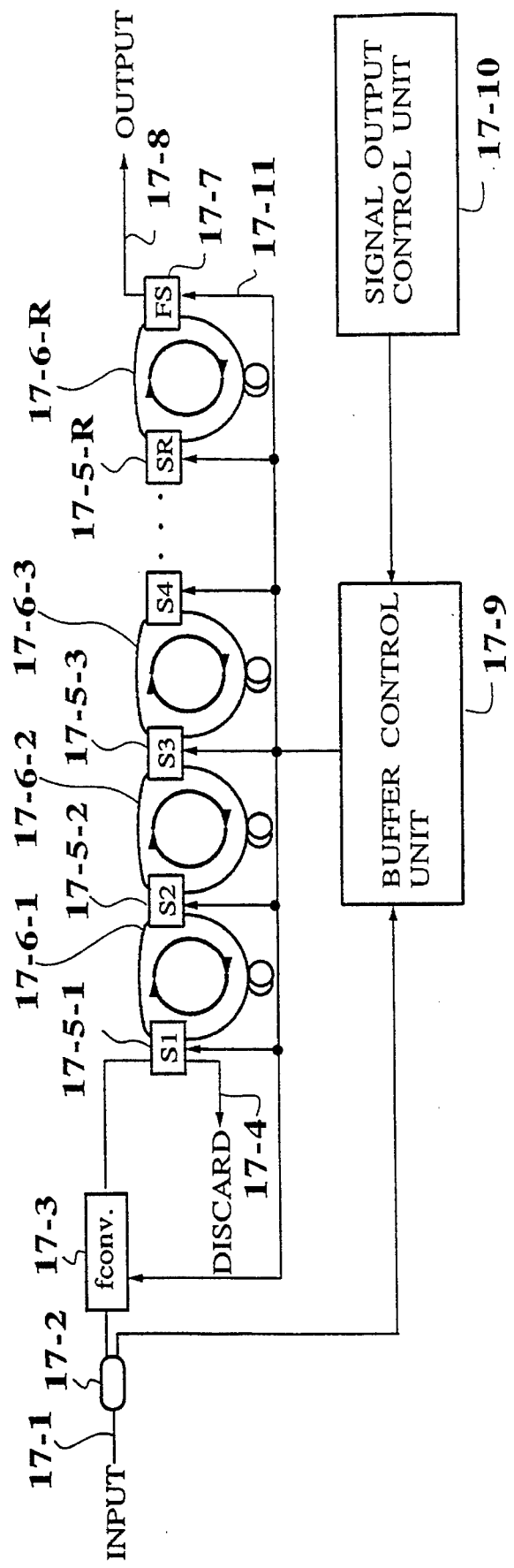
FIG. 17 is a schematic block diagram of the third embodiment of a photonic frequency division multiplexed FIFO buffer according to the present invention.

Referring now to FIG. 17, the third embodiment of the photonic frequency division multiplexed FIFO buffer according to the present invention, which realizes a one input one output FIFO buffer, will be described in detail.

In this third embodiment, the photonic frequency division multiplexed FIFO buffer comprises: time division multiplexed input highway 17-1; a signal monitor splitter 17-2 connected with the input highway 17-1; a frequency channel convertor 17-3 connected with the splitter 17-2; 2×2 frequency channel selectors 17-5-1 to 17-5-R and a 1×2 frequency channel selector 17-7 connected in series with the splitter 17-2 by loop shaped optical waveguides 17-6-1 to 17-6-R associated with the 2×2 frequency channel selectors 17-5-1 to 17-5-R; a signal discarding line 17-4 connected with the first 2×2 frequency channel selector 17-5-1; a time division multiplexed output highway 17-8 connected with the 1×2 frequency channel selector 17-7; a buffer control unit 17-9 connected with the splitter 17-2 and controlling the frequency channel convertor 17-3, the 2×2 frequency channel collective selectors 17-5-1 to 17-5-R, and the 1×2 frequency channel selector 17-7 through a control signal line 17-11; and a signal output control unit 17-10 connected with the buffer control unit 17-9.

In this configuration of FIG. 17, the optical signals on the input highway 17-1 are entered into the loop shaped optical waveguides 17-6-1 to 17-6-R through the splitter 17-2, the frequency channel convertor 17-3, and the 2×2 frequency channel selectors 17-5-1 to 17-5-R, and buffered therein.

Here, each loop shaped optical waveguide 17-6-i (i=1 to R) functions as a single buffer. The input signals are converted by the frequency channel convertor 17-3 into an arbitrary unused frequency channel in the first stage buffer 17-6-1, so as to be stored in that unused frequency channel. When each buffer stores the signals in the frequency channel corresponding to an empty frequency channel in the next stage buffer among the signals stored within each buffer, the signals of that empty frequency channel are transferred to the next stage buffer by the 2×2 frequency channel selector 7-5-(1+1) provided between that each buffer and the next stage buffer, while keeping the signals of the other frequency channels in circulation at each buffer.

The 1×2 frequency channel selector 17-7 selectively outputs the signals in the specific frequency channel specified by the control signal from the buffer control unit 17-9 from the last stage buffer 17-6-R to the output highway 17-8, while keeping the signals of the other frequency channels in circulation at the last stage buffer 17-6-R. In a case the frequency channels in the first stage buffer 17-5-1 are totally occupied, the entered input signals are discarded by the first 2×2 frequency channel collective selector 17-5-1 through the signal discarding line 17-4.

Here, the buffer control unit 17-9 controls the operation of the frequency channel convertor 17-3, the 2×2 frequency channel selectors 17-5-1 to 17-5-R, and the 1×2 frequency channel selector 17-7 as described above by monitoring in advance the buffer input signals split by the splitter 17-2, and in accordance with a back pressure (BP) signal from the signal output control unit 17-10 indicating a permission or a rejection of the signal output. Namely, the buffer control unit 17-9 analyzes the buffer input signals and the back pressure signal, and supplies the control signals for controlling the frequency channel convertor 17-3, the 2×2 frequency channel selectors 17-5-1 to 17-5-R, and the 1×2 frequency channel selector 17-7 accordingly through the control signal line 17-11. Here, the input signals from the splitter 17-2 to the frequency channel convertor 17-3 is appropriately delayed by a delay line (not shown) until the control signals are supplied from the buffer control unit 17-9. In this manner, the signals arriving from the input highway 17-1 are outputted to the output highway 17-8 in their orders of arrivals by the above described operation of the photonic frequency division multiplexed FIFO buffer of this third embodiment.

Figure 18:
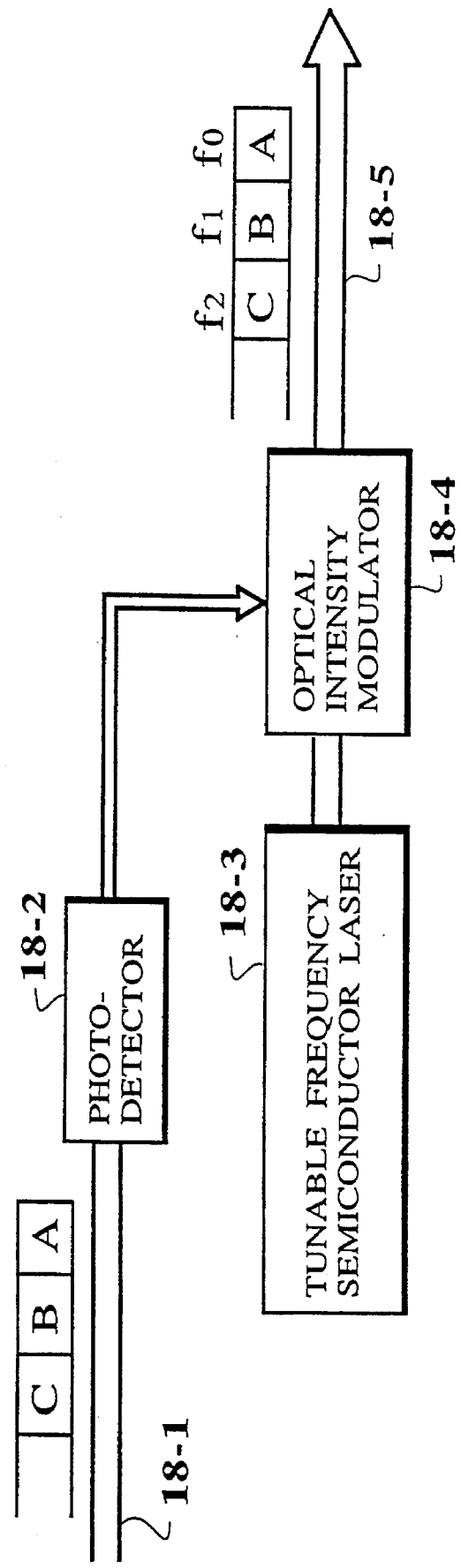
FIG. 18 is a block diagram of a frequency channel convertor used in the third embodiment of FIG. 17.

In this third embodiment, the frequency channel convertor 17-3 has an exemplary configuration as shown in FIG. 18, which comprises an input line 18-1 before the frequency conversion, a photo-detector 18-2 connected with the input line 18-1, a tunable frequency semiconductor laser 18-3; an optical intensity modulator 18-4 connected with the photo-detector 18-2 and the tunable frequency semiconductor laser 18-3; and an input line 18-5 after the frequency conversion which is connected with the optical intensity modulator 18-4.

In the configuration of FIG. 18, time division signals entered from the input line 18-1 are converted into high speed electrical signals by the photo-detector 18-2, and the obtained electrical signals are then used for driving the optical intensity modulator 18-4. On the other hand, the tunable frequency semiconductor laser 18-3 generates a laser beam of the desired frequency according to the control signal from the buffer control circuit 17-9 and supplies the generated laser beam to the optical intensity modulator 18-4. Then, the laser beam supplied from the tunable frequency semiconductor laser 18-3 is modulated at the optical intensity modulator 18-4 according to the electrical signals supplied from the photo-detector 18-2.

Here, it is possible to construct the entire frequency convertor optically if it is possible to use an optically controllable optical intensity modulator, or a tunable frequency semiconductor laser that can be optically controlled to directly modulate the generated laser beam.

Figure 19:
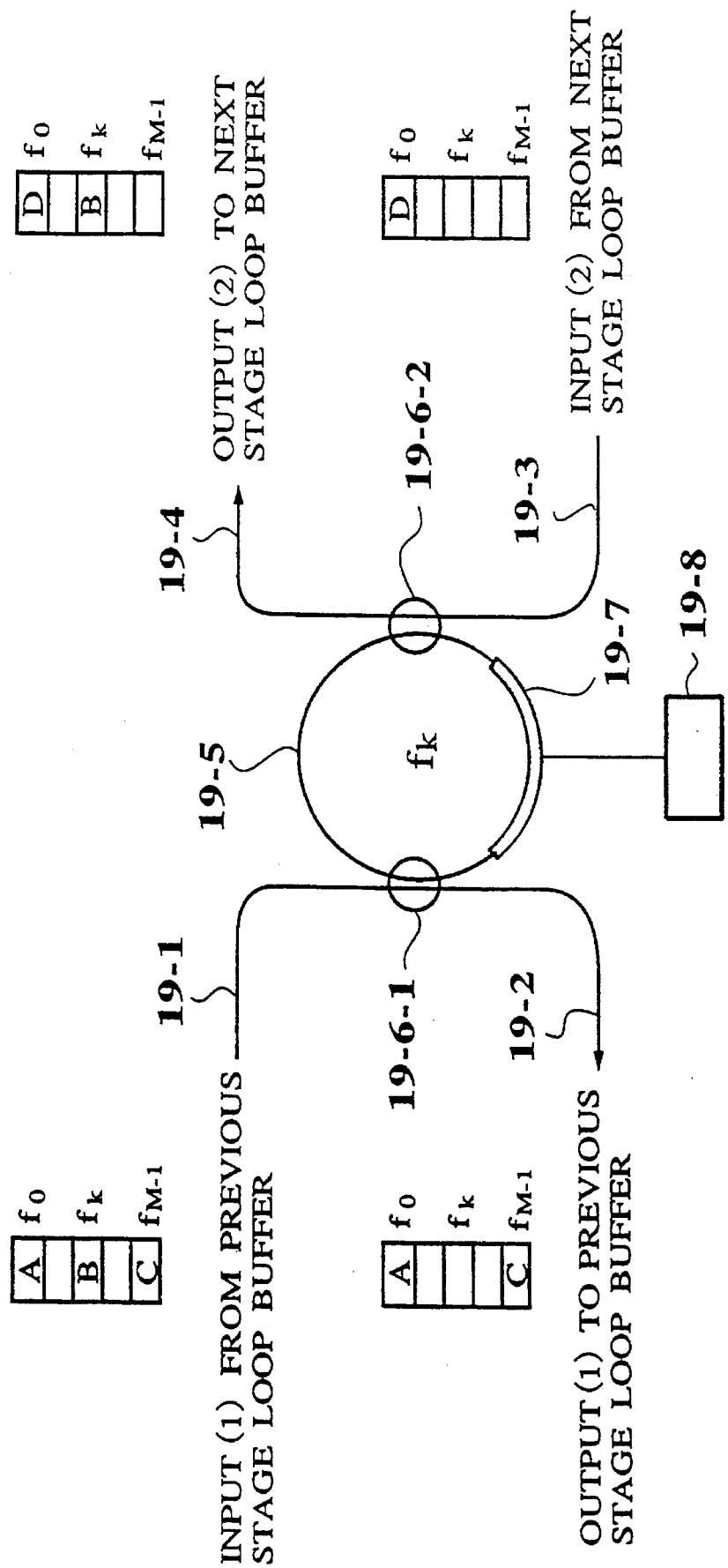
FIG. 19 is a block diagram of a 2×2 frequency channel selector used in the third embodiment of FIG. 17.

In this third embodiment, each of the 2×2 frequency channel selectors 17-5-1 to 17-5-R has an exemplary configuration shown in FIG. 19, which comprises: an input port (1) 19-1 connected with the previous stage loop buffer; an output port (1) 19-2 connected with the previous stage loop buffer; an input port (2) 19-3 connected with the next stage loop buffer; an output port (2) 19-4 connected with the next stage loop buffer; a ring shaped optical resonators 19-5 connected with a line joining the input port (1) 19-1 and the output port (1) 19-2 and a line joining the input port (2) 19-3 and the output port (2) 19-4 through directional couplers 19-6-1 and 19-6-2; a phase shifter 19-7 attached to the ring shaped optical resonator 19-5; and a phase shifter setting power source 19-8 connected with the phase shifter 17-7.

In this configuration of FIG. 19, among the frequency multiplexed signals entering from the input port (1) 19-1, the signal of the frequency channel which coincides with the resonance frequency of the ring shaped optical resonator 19-5 is outputted to the output port (2) 19-4, while the signals of the other frequency channels are outputted from the output port (1) 19-2. Here, the resonance frequency is determined by the optical path length of the ring shaped optical resonator 19-5, and can be adjusted to any desired frequency channel by changing the optical path length of the ring shaped optical resonator 19-5 by the phase shifter 19-7. Here, the phase shifting amount of the phase shifter 19-7 is adjusted at each timeslot by the phase shifter setting power source 17-8, such that the frequency channels can be selected at high speed. In this manner, the signal of the desired frequency channel for each timeslot alone is selectively outputted to the next stage loop buffer, while the signals of the other frequency channels are returned to the previous stage loop buffer.

Figure 20:
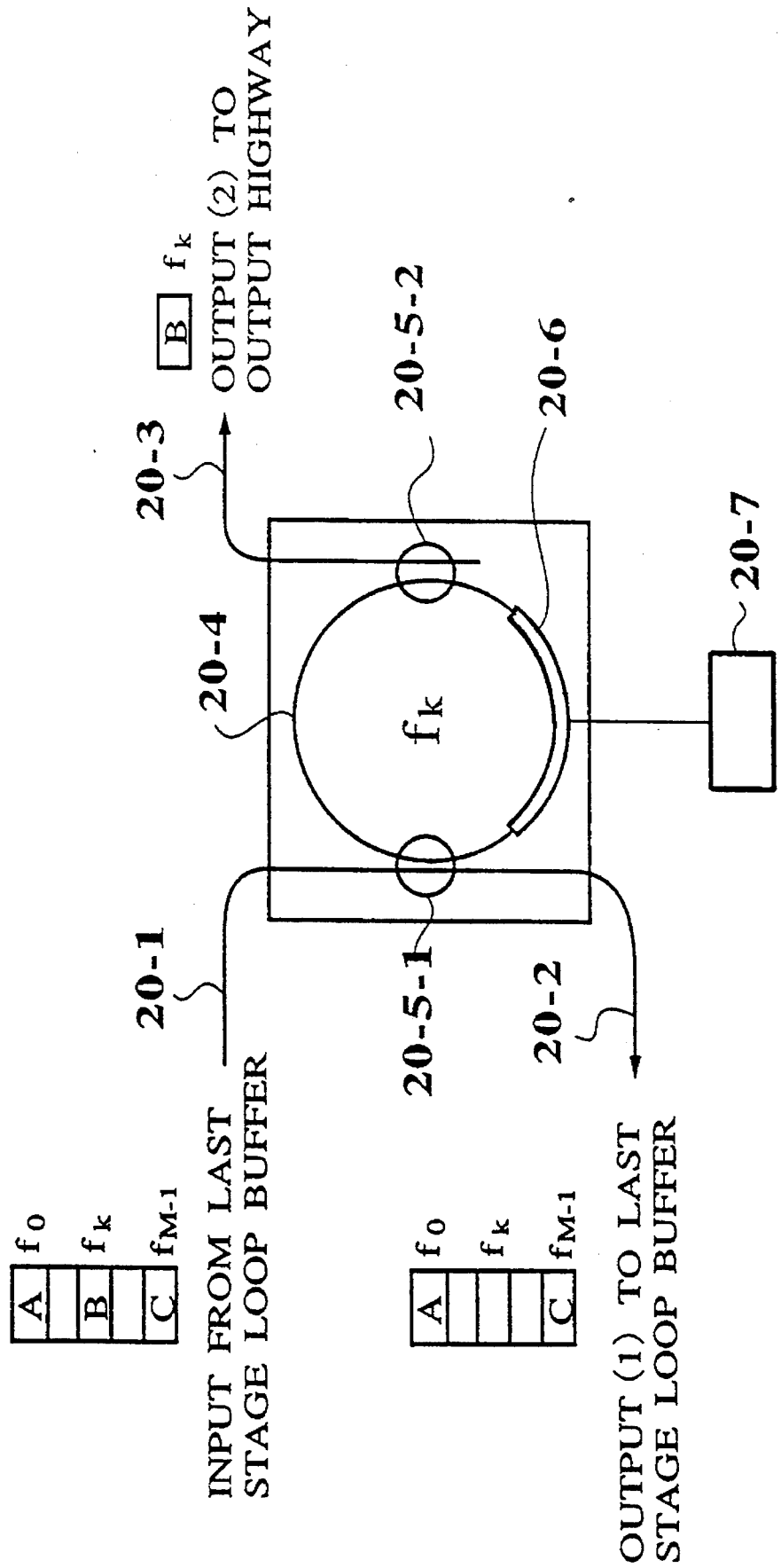
FIG. 20 is a block diagram of a 1×2 frequency channel selector used in the third embodiment of FIG. 17 and the second embodiment of FIG. 4.

In this third embodiment, the 1×2 frequency channel selector 17-7 has an exemplary configuration shown in FIG. 20, which comprises: an input port 20-1 connected with the last stage loop buffer; an output port (1) 20-2 connected with the last stage loop buffer; an output port (2) 20-3 connected with the output highway; a ring shaped optical resonator 20-4 connected with a line joining the input port 20-1 and the output port (1) 20-2 and a line connected to the output port (2) 20-3 through directional couplers 20-5-1 and 20-5-2; a phase shifter 20-6 attached to the ring shaped optical resonator 20-4; and a phase shifter setting power source 20-7 connected with the phase shifter 20-6.

In this configuration of FIG. 20, among the frequency multiplexed signals entering from the input port 20-1, the signal of the frequency channel which coincides with the resonance frequency of the ring shaped optical resonator 20-4 is outputted to the output port (2) 20-3, while the signals of the other frequency channels are outputted from the output port (1) 20-2. Here, the resonance frequency is determined by the optical path length of the ring shaped optical resonator 20-4, and can be adjusted to any desired frequency channel by changing the optical path length of the ring shaped optical resonator 20-4 by the phase shifter 20-6. Here, the phase shifting amount of the phase shifter 20-6 is adjusted at each timeslot by the phase shifter setting power source 20-7, such that the frequency channel can be selected at high speed. In this manner, the signal of the desired frequency channel for each timeslot alone is selectively outputted to the output highway, while the signals of the other frequency channels are returned to the last stage loop buffer.

Figure 21:
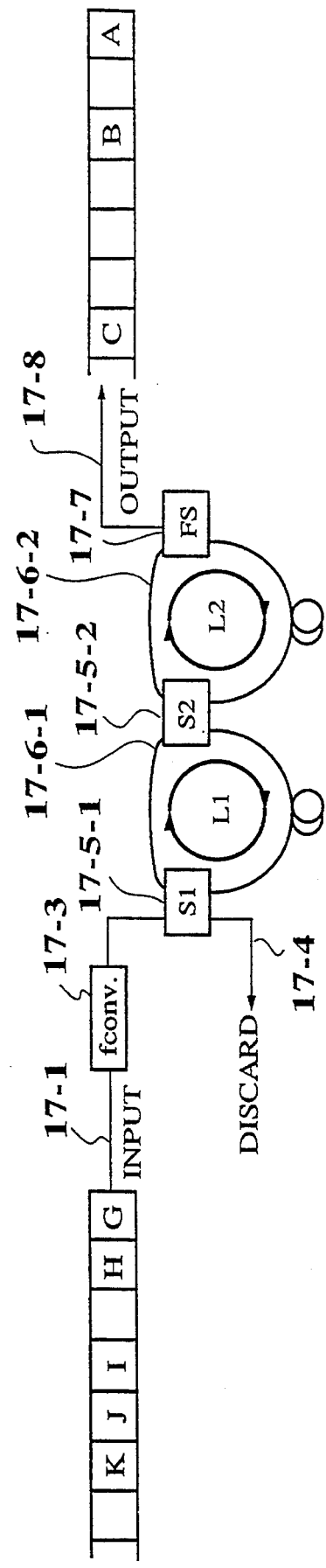
FIG. 21 is a block diagram of an exemplary simplified buffer configuration in accordance with the third embodiment of FIG. 17.

Now, FIG. 21 shows an exemplary simplified buffer configuration with only two loops in accordance with the third embodiment of FIG. 17 described above, in which the buffer control unit 17-9 carries out the control according to the timing chart of FIG. 22 as follows. Here, the frequency multiplexed signals G to K are entered as indicated in FIG. 21 and FIG. 22, while the signals A to F are already buffered as indicated in FIG. 22.

First, when the signal G is entered, this signal G is converted into the frequency channel f2 by the frequency channel converter 17-3, and stored in the loop buffer (L1) 17-6-1 through the 2×2 frequency channel selector (S1) 17-5-1, as the largest frequency channel occupied by the signal in the loop buffer (L1) 17-6-1 is the signal F in the frequency channel f1 and the frequency channel f2 is the smallest empty frequency channel in the loop buffer (L1) 17-6-1. Among the signal stored in the loop buffers (L1, L2) 17-6-1 and 17-6-2, those signals whose frequency channels are empty frequency channels in the next stage buffer are transferred to the next stage buffer by the 2×2 frequency channel selector (S1 and/or S2) 17-5-1 and/or 17-5-2, while the signals of the other frequency channels are retained in the current stage buffer.

Figure 22:
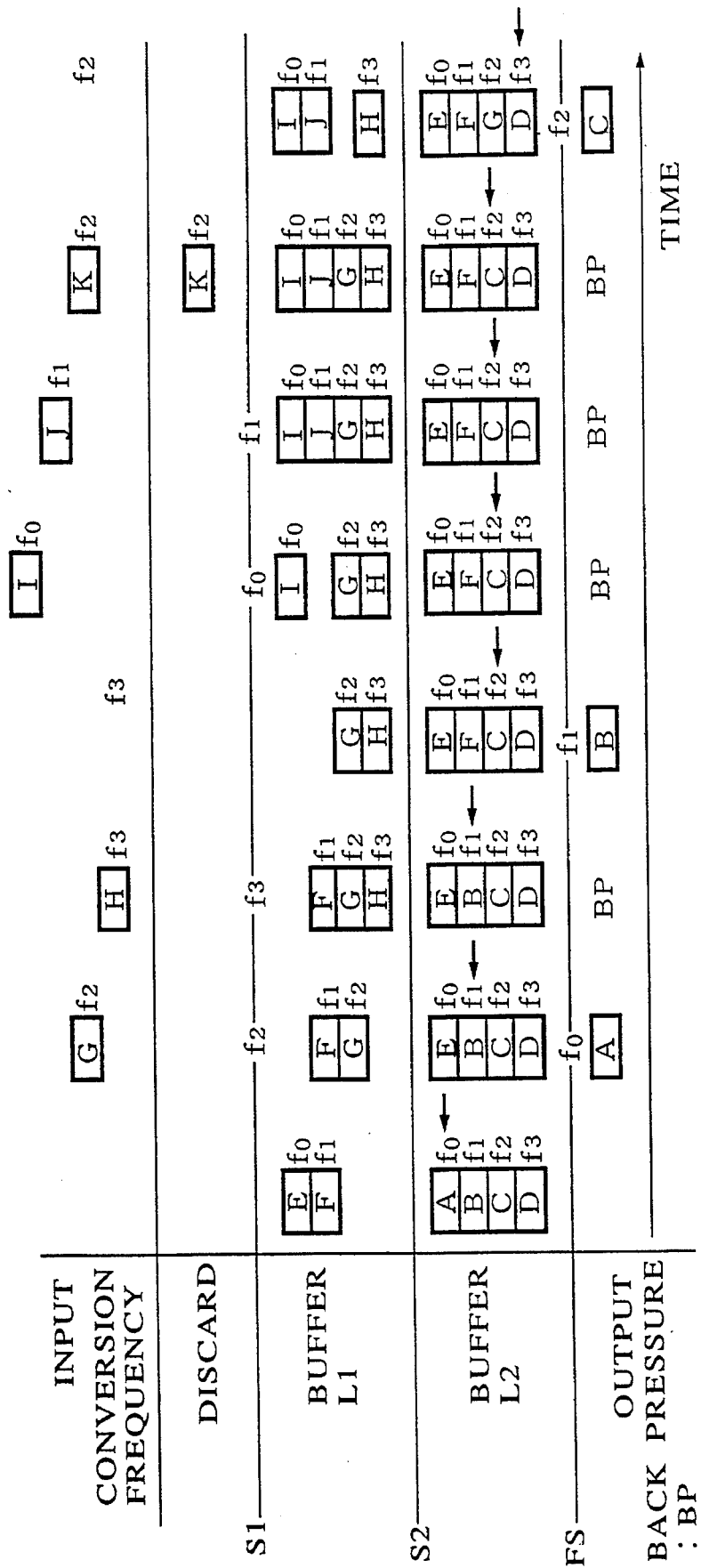
FIG. 22 is the timing chart for the operation in the exemplary simplified buffer configuration of FIG. 21.

In FIG. 22, the signal in the loop buffer (L2) 17-6-2 which is attached with pointer (←) at each timing is the signal which is going to the outputted to the output highway 17-8 by the 1×2 frequency channel selector (FS) 17-7 unless the back pressure (BP) signal comes at the next timeslot, while the other signals are the signals which are going to be retained in the last stage loop buffer (L2) 17-6-2. The pointer is shifted one by one whenever one signal is outputted to the output highway 17-8.

Then, the next input signal H is converted into the frequency channel f3 by the frequency channel converter 17-3, and stored in the loop buffer (L1) 17-6-1 through the 2×2 frequency channel selector (S1) 17-5-1. In this manner, the frequency channel convertor 17-3 allocates the frequency channels sequentially to the input signals according to the orders of their arrivals. The input signal is discarded whenever all the frequency channels in the loop buffer (L1) 17-6-1 are totally occupied.

Hereafter, the similar operation is carried under the control of the buffer control unit 17-9 such that the frequency channel is transferred forward to the next stage as long as there is an empty frequency channel in the next stage, or retained in the current stage loop buffer as long as all the frequency channels are occupied in the next stage.

As described, according to the third embodiment of the present invention, the frequency multiplexing is made by allocating the frequency channels sequentially to the input signals and the loop shaped optical waveguide delay lines are utilized in the frequency multiplexed state such that a plurality of the input optical signals can be collectively buffered, and therefore the one input one output FIFO buffer can be constructed economically by using only a small number of buffers.

It is to be noted that the back pressure (BP) signal from the signal output control unit 17-10 used in this third embodiment of FIG. 17 may be incorporated into the first or second embodiment of FIG. 3 or FIG. 4 described above, if desired.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A photonic frequency division multiplexed FIFO buffer for inputting a plurality of input optical signals on a time division multiplexed input highway and outputting output optical signals at timeslots on a time division multiplexed output highway, comprising:

splitter means for splitting the input optical signals into two;

frequency convertor means, connected with one output of the splitter means, for converting the input optical signals into sequentially different frequency channels;

a plurality of loop shaped optical waveguide delay lines for storing the input optical signals;

a plurality of 2×2 optical switch means for connecting the loop shaped optical waveguide delay lines in series with an output of the frequency convertor means, and selectively transferring the input optical signals among the loop shaped optical waveguide delay lines;

1×2 frequency channel selector means, connected at a last stage of the loop shaped optical waveguide delay lines, for selectively outputting optical signals in specific frequency channels among the input optical signals stored by the last stage of the loop shaped optical waveguide delay lines as the output optical signals to the output highway;

signal output control means for controlling an output timing of the output optical signals from the 1×2 frequency channel selector means; and buffer control means for generating a control signal for controlling a selective transferring by each of the 2×2 optical switch means and a selective outputting by the 1×2 frequency channel selector means according to another output of the splitter means and the output timing controlled by the signal output control means.

2. The photonic frequency division multiplexed FIFO buffer of claim 1, wherein the frequency convertor means allocates sequentially different frequency channels to the input optical signals according to orders of arrivals of the input optical signals.

3. The photonic frequency division multiplexed FIFO buffer of claim 1, wherein the 2×2 optical switch means includes: a first 2×2 optical switch means having one input connected with said output of the frequency convertor means, one output for discarding the input optical signals, another input and another output connected with a first stage of the loop shaped optical waveguide delay lines; and second and subsequent 2×2 optical switch means, each of which is provided between two adjacent ones of the loop shaped optical waveguide delay lines and having one input and one output connected with a previous stage of the loop shaped optical waveguide delay lines and another input and another output connected with a next state of the loop shaped optical waveguide delay lines.

4. The photonic frequency division multiplexed FIFO buffer of claim 1, wherein the 2×2 optical switch means selectively transfers only the optical signals in specific frequency channels specified by the control signal from one stage of the loop shaped optical waveguide delay lines to a next stage of the loop shaped optical waveguide delay lines.

5. The photonic frequency division multiplexed FIFO buffer of claim 1, wherein each of the 2×2 optical switch means provided between two adjacent ones of the loop shaped optical waveguide delay lines includes:

an input port for entering the input optical signals from a previous stage of the loop shaped optical waveguide delay lines;

a ring shaped optical resonator having a resonance frequency adjustable by changing an optical path length;

a phase shifter for adjusting the optical path length of the ring shaped optical resonator;

a first directional coupler for coupling the input optical signals entered from the input port to the ring shaped optical resonator;

a second directional coupler for coupling only optical signals in a frequency channel coinciding with the resonance frequency of the ring shaped optical resonator among the input optical signals from the ring shaped optical resonator to a next stage of the loop shaped optical waveguide delay lines; and an output port for returning all optical signals in frequency channels not coinciding with the resonance frequency of the ring shaped optical resonator among the input optical signals from the ring shaped optical resonator to a previous stage of the loop shaped optical waveguide delay lines.

6. The photonic frequency division multiplexed FIFO buffer of claim 1, wherein the 2×2 optical switch means selectively transfers the input optical signals from one stage of the loop shaped optical waveguide delay lines to a next stage of the loop shaped optical waveguide delay lines whenever the next stage of the loop shaped optical waveguide delay lines has an empty frequency channel, and retains the input optical signals in said one stage of the loop shaped optical waveguide delay lines whenever the next stage of the loop shaped optical waveguide delay lines has no empty frequency channel.

7. The photonic frequency division multiplexed FIFO buffer of claim 1, wherein the 1×2 frequency channel selector means includes:

an input port for entering the input optical signals from a last stage of the loop shaped optical waveguide delay lines;

a ring shaped optical resonator having a resonance frequency adjustable by changing an optical path length;

a phase shifter for adjusting the optical path length of the ring shaped optical resonator;

a first directional coupler for coupling the input optical signals entered from the input port to the ring shaped optical resonator;

a second directional coupler for coupling only optical signals in a frequency channel coinciding with the resonance frequency of the ring shaped optical resonator among the input optical signals from the ring shaped optical resonator to the output highway; and an output port for returning all optical signals in frequency channels not coinciding with the resonance frequency of the ring shaped optical resonator among the input optical signals from the ring shaped optical resonator to the last stage of the loop shaped optical waveguide delay lines.

\* \* \* \* \*